(12) United States Patent
Braunstein

(10) Patent No.: US 8,695,872 B2
(45) Date of Patent: Apr. 15, 2014

(54) APPARATUS IMPROVING ITEM TRANSACTIONS WITH REAL-TIME CONTROLS AND NAVIGATION

(76) Inventor: Zachary L. Braunstein, San Marcos, CA (US)

( * ) Notice: Subject to any disclaimer, the term of this patent is extended or adjusted under 35 U.S.C. 154(b) by 430 days.

(21) Appl. No.: 13/225,551

(22) Filed: Sep. 6, 2011

(65) Prior Publication Data

US 2012/0080517 A1    Apr. 5, 2012

Related U.S. Application Data

(60) Provisional application No. 61/404,475, filed on Oct. 4, 2010.

(51) Int. Cl.
*G06Q 40/00* (2012.01)
(52) U.S. Cl.
USPC .......................................................... 235/379
(58) Field of Classification Search
CPC ..... G06Q 30/06; G06Q 20/32; G06Q 10/087; G06Q 20/327; G06Q 20/363; G06Q 30/02; G07C 2011/02; G07C 9/00111; G07F 11/62; G07F 7/0866; G07F 19/3462
USPC .......................................................... 235/379
See application file for complete search history.

(56) References Cited

U.S. PATENT DOCUMENTS

| | | | | |
|---|---|---|---|---|
| 2003/0158796 | A1* | 8/2003 | Balent | 705/28 |
| 2004/0262386 | A1* | 12/2004 | Abrams et al. | 235/383 |
| 2005/0071234 | A1* | 3/2005 | Schon | 705/22 |

* cited by examiner

*Primary Examiner* — Seung Lee
*Assistant Examiner* — Tae Kim

(57) ABSTRACT

Invention describes real-time control system increasing shopping efficiency, maintaining item quality, inventory, and directing customer transactions, requiring handling and processing of items only once. Invention controls access to items inside modules via card with unique embedded identification features. Invention stores customer transactions and entered shopping lists. Invention per customer selected shopping list and items availability, will in real-time navigate customer to complete required transactions within customer selected criteria. Invention controls card identification features and modules containing items. Invention based on card identification and item identification such as barcode information will store customer executed transactions, and will require customer to pay for completed transactions before leaving the store. Invention in real-time maintains inventory of items, controls environment surrounding items, and reports items exceeding shelf life limit preventing their transaction. Invention analyzes transactions executed by the card, correlates transactions to customer at payment module, stores behavior patterns for future optimizations of transactions.

21 Claims, 18 Drawing Sheets

APPARATUS IMPROVING ITEM TRANSACTIONS WITH REAL-TIME CONTROLS AND NAVIGATION

CROSS-REFERENCE TO RELATED APPLICATIONS

Figure 1:
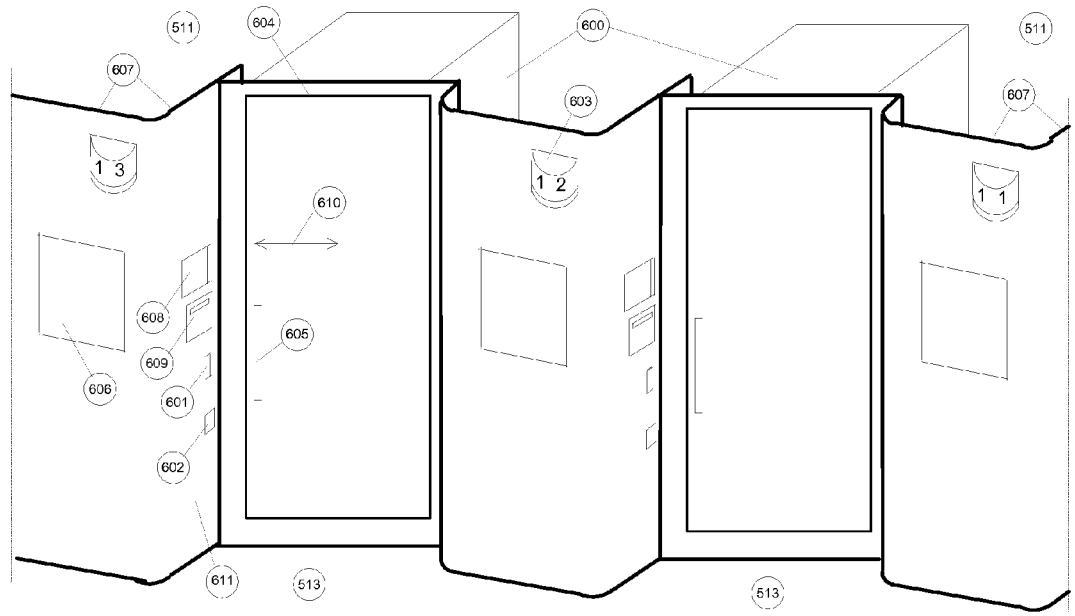

I claim the benefits of Provisional Application No. 61/404,475 filed on Oct. 4, 2010, title "Apparatus for analyzing and controlling object behavior, item transactions, using a Card with embedded mechanical, electronic and barcode identifications".

STATEMENT REGARDING FEDERALLY SPONSORED RESEARCH OR DEVELOPMENT

Not applicable.

REFERENCE TO SEQUENCE LISTING, A TABLE, OR A COMPUTER PROGRAM LISTING COMPACT DISK APPENDIX

Not applicable

BACKGROUND OF THE INVENTION

There are number of applications, including retail and grocery stores, which are interested in improving their service and reduce operating costs. The current trend to achieve the objectives is mainly focused on improving tracking of the merchandize within the store environment. There is an increased trend to use barcode labels and RFID devices to be attached to packing of the merchandize, and then use respective devices to track their location within a store, as needed. The RFID devices are still relatively expensive vs. the costs of most merchandize it could be assigned to. In addition, significant amount of RFID devices within an enclosed facility, such as a store, could have a negative impact on the environment. Also, there is a challenge to attach an RFID to some packaged products such as: vegetables, fruits, etc. Customers, in order to gain access to automatic machines, may be required to provide identification and enter a secret passcode. There is a growing concern in terms of safety and quality of products, such as vegetables—being presented to a customer in a format, which could be influenced by bacteria deposited either directly by previous customer, or indirectly—by bacteria within the inadequately controlled environment surrounding the item. In addition, with increasing demand for organic products, compliance to respective item specification requirements is highly important, since organic products, in general, compared to chemically treated products, are less resistant in retaining their quality when specifications are not complied to. Non-compliance to product specifications, even during a short period of time, could impact quality, including longevity, of an organic product. Organic products are, in general, more expensive and customers are entitled to be able to purchase them at their best quality.

The invention provides solution for significant improvements of quality of service utilizing innovative and unique technologies, which are user-friendly, environmentally safe and cost efficient. The invention will describe unique Apparatus, consisting of several major components, including: Modules with items, Controllers which monitor and maintain quality of items inside Modules, as well as their availability for purchase by Customers; Card with Embedded Electronics, Mechanical and Barcode Identifications (SHOPPING CARD), which is used by Customers to gain access to items inside Modules and complete item transactions; and the same Card which could be configured to allow a store controller to navigate Customer within the store to complete selected or created shopping list within the shortest time possible. The Apparatus could be configured in real-time as stand-alone, or integrated with other Apparatuses into a network, where all transactions of items are monitored by controller. The invention will help number of businesses to improve service and reduce operating costs, while maintaining user-friendly and environmentally safe environment. The invention offers unique combination of features, which could be configured in real-time, as needed, to allow a business to provide the most effective, efficient, safe and reliable service. The invention simplifies access of customers to restricted or authorized machines (modules) or sections, by utilization of a single Card with multiple identification features as described in this application. The Apparatus of the invention includes controllers, which will monitor, analyze and record behavior of the Card within a designated location (store), including Transactions executed, and in real-time execute controls, which will impact the ability of the Card to execute specific Transactions in the location (store), with the objective to sustain secured, reliable and efficient operation of the business at the location (store). The Apparatus could be configured to provide real-time navigation of a Customer with Shopping Card within a store location with an objective to complete purchases of items selected by Customer on a Shopping List within set criteria, such as: minimum time. Controllers of the Apparatus store in the non-volatile data base data, including: configurations of the Apparatus, including individual devices of the Apparatus; real-time item transactions; customer authorized configurations and history, including: shopping lists, navigation history, payment information.

BRIEF SUMMARY OF THE INVENTION

The Apparatus described by this invention is based on devices supporting utilization of a unique Shopping Card with embedded Electronics, Mechanical and Barcode identifications, for simplicity referenced as a Card. The Card itself could be configured to include:

a) Unique identification principal combining any combination of available identifications, including: Mechanical ID, Electronic ID and Barcode ID. By making the size of the SHOPPING CARD large enough, it will significantly reduce risks of these Cards being taking out of a store without authorization, which accomplishes a similar function by using RFID devices b) Mechanical ID—identification principals include: Card shape; Card size; location, shape, number and size of openings on the Card; materials the Card or section of are made from; color of the entire Card or sections of; special alignment grooves or channels for ease of insertion of the Card into and alignment with respective slots of a Card Recognition Device; and other mechanical features, which could be recognized or identified by such sensors as: optical, electro-mechanical, etc. In addition, physical properties, such as: fabrication materials, outer or inner layers of the Card or sections of—could be used or embedded to further distinguish the Card features and properties. Identification openings could be grouped, numbered, referenced in X-Y coordinate system, and treated as binary to indicate their status as binary "1" hole is present at specified location, and "0"—hole is absent at the specified location. Identification openings could represent patterns, unique for each Card. Location of each identification opening could be referenced as a number—"1, 2, 3, etc." and/or by its {X,Y} coordinates, such as: {1, 0.5}, {0.2, 1.125}. Coordinates {X, Y} could be referenced to alignment holes, and/or alignment marks available on the Card, and measurement units could include: Metric, English. Location of all Card identifications: mechanical, electronic, barcode—could be referenced in {X,Y} coordinate system to alignment holes, and/or alignment marks available on the Card, and measurement units could include: Metric, English. The size, shape, orientation, number and materials of the alignment grooves or channels could be selected to provide reliable mating and engagement with respective channels or grooves inside the slot of the Card Recognition Devices. Orientation marking in a form of an embedded arrow could be added to one or both sides of the Card, and indicate the direction of insertion into a slot of a Card Recognition Device.

c) Barcode ID—industry standard, which could be embedded into the Card, or attached by conventional means such as: epoxy, and recognized or read by respective barcode readers. There could be several barcode labels embedded or attached to the Card, and their orientation could vary. For embedded barcodes, the respective section of the Card could be made our of transparent materials, such as clear plastic, so that the barcode embedded into this section could be identified by respective barcode readers from either side of the Card.

d) Electronic ID—industry standard RFID, and/or magnetic stripe, and/or passive electronic circuit, which could be embedded into the Card, or attached by conventional means such as: epoxy, and recognized or read by respective sensors and controllers local or remote. Utilization of RFID adds important features, including—monitoring location of all SHOPPING CARD Cards within a specified area. In addition, embedded controller into a shopping Card will provide customer with ability to select or enter a shopping list, and then under navigation of a store controller—execute the shopping list selected within set criteria, such as time.

The apparatus is unique and innovative product, with substantial benefits to both: the providers (stores, etc.) and the consumers (shoppers, etc.). Using apparatus, as described by the invention, customers are guaranteed to purchase quality items with a single scan-identification of each item, meaning—a purchased item is placed inside a customer cart or a bag only once while in the store. This is a significant improvement over existing methods, where items are pulled off-the-shelves into a cart, and then out for scanning by a cashier and then back again after they have been paid for. This is also a significant simplification of identification of a customer by a single Card with multiple identification features controlled by the provider. It is important feature of the Apparatus described by the invention, that it could operate with Cards having only Mechanical Identifications, and Modules containing only packaged Items identified by a label with a barcode. Modules could be designed to sustain environment inside, which is friendly to the items stored inside. In addition, anti-bacterial natural environmentally friendly ingredients could be added to sanitize and maintain bacteria-free environment surrounding items stored inside the Module. In addition, all essential features of the Apparatus described in the invention—could be designed using environmentally friendly components. All these features, allow the Apparatus described in the invention—to achieve superior objectives in terms of: quality, safety, security and efficiency in providing affordable, profitable and environmentally friendly service vs. existing methods.

BRIEF DESCRIPTION

Drawing Content and Listing

Our application contains drawings listed in Table 1, below.

TABLE 1

List of Drawings.

| FIG. | Description |
|---|---|
| 1 | 3D-veiw of Apparatus configured with automated product Modules and user interfaces installed into wall partitions |
| 2 | 3D-veiw of Apparatus configured with automated product Modules and user interfaces installed into wall partitions and Module |
| 3 | Top view of Apparatus configured with automated product Modules and user interfaces installed into wall partitions |
| 4 | Top view of Apparatus configured with automated product Modules and user interfaces installed into wall partitions and Module |
| 5 | Shopping Card configured with embedded mechanical, barcode and RFID identifications |
| 6 | Example of a Shopping Card configured with dual column Mechanical ID features |
| 7 | Example #1 of a Shopping Card configured with single column Mechanical ID features |
| 8 | Example #2 of a Shopping Card configured with single column Mechanical ID features |
| 9 | Example #3 of a Shopping Card configured with single column Mechanical ID features |
| 10 | Example #4 of a Shopping Card configured with single column Mechanical ID features |
| 11 | Example #5 of a Shopping Card configured with embedded mechanical, barcode, RFID and electrical identifications |
| 12 | Example #6 of a Shopping Card configured with embedded mechanical, barcode, electrical identifications, including optical alignment marks |
| 13 | Example #7 of a Shopping Card configured with embedded mechanical, barcode, RFID, electrical identifications, including optical alignment marks |
| 14 | Schematic of embedded in-parallel resistor network |
| 15 | Example #8 of a Shopping Card configured with embedded mechanical identifications, including optical alignment marks |
| 16 | Control Room—for monitoring and controlling activities within a store, including transactions performed using a Shopping Card |
| 17 | Module configured as automatic vending module with sensors for detecting and authorizing transactions using a Shopping Card |
| 18 | Module configured as automated product module with sensors for detecting and authorizing transactions using a Shopping Card |
| 19 | Module configured as a payment station with sensors for detecting and authorizing payment for transactions using a Shopping Card |
| 20 | Example of racks for storing Shopping Cards |
| 21 | Example of an Apparatus configured for monitoring and controlling transactions within a store, including: Modules with items accessible by a Shopping Card |
| 22 | An example of Apparatus configured for monitoring and controlling transactions within a store using one central controller |
| 23 | An example of Apparatus configured for monitoring and controlling transactions within a store using local and central controllers interconnected via LAN |
| 24 | Example #9 of a Shopping Card configured with mechanical alignment feature in a form of a groove or slot, and an opening configured for latching the Card |
| 25 | Card Recognition Device configured with an alignment channel for mating with the respective groove of a Shopping Card |
| 26 | Example of inserting of a Shopping Card into a Card Recognition Device configured with alignment features |
| 27 | Example #10 of a Shopping Card configured with mechanical alignment feature in a form of a groove or slot, and embedded arrow indicating the direction of insertion |
| 28 | Example of inserting of a Shopping Card into a Card Recognition Device configured with alignment features, installed inside a Module |
| 29 | Front view of a product module configured with a multi-section rotating shelve with devices including: Card recognition, barcode scan, scale. |
| 30 | Example of multi-shelve sectional arrangement for storing items |
| 31 | Top view of a product module configured with a multi-section rotating shelve with devices including: Card recognition, barcode scan, scale. |

TABLE 1-continued

List of Drawings.

| FIG. | Description |
|---|---|
| 32 | Top view of a layout with two product modules configured with a multi-section rotating shelve with devices including: Card recognition, barcode scan, scale. |
| 33 | Top view of a layout with 12 product modules configured with a sliding access door multi-section rotating shelve with devices including: Card recognition, barcode scan, scale. |
| 34 | Top view of a layout with 12 product modules configured with a rotational access door multi-section rotating shelve with devices including: Card recognition, barcode scan, scale. |
| 35 | Example of user interface features installed on a Shopping Card with single line item display and navigation |
| 36 | Example of user interface features installed on a Shopping Card with multi-line item display and navigation |
| 37 | Diagram of an Apparatus configured for store automation, including: automated inventory management, automated navigation of customers per selected shopping list; automated recording of item transactions; automated payment for transaction |

DRAWING CONVENTION AND FORMAT

Drawings with this application are not to scale.

DEFINITIONS

Apparatus

Collection of devices and components, including: controllers; sensors; non-volatile memory; identification Cards; Card recognition devices; modules with items, access to which is restricted by an access door; location with items access to which is restricted by an access door, which are all interconnected as a real-time closed loop control system. The control system or Apparatus will directly, without operator assistance, based on information obtained from the Card and based on set criteria, execute control of devices to authorize access to items inside the module or access to a location where items are present. The control system or Apparatus will monitor, analyze and record transactions of items executed under unique identification features of the Card being used to gain access to the items. The control system or Apparatus without operator assistance, will monitor, analyze and record transactions executed under unique identification features of a Card being used, and provide the records to modules to complete the transactions, including generating an invoice of items being purchased and receipt of a payment received for items being purchased. The control system or Apparatus directly or indirectly via operator will maintain in real-time required inventory of items within a module or a location. The control system or Apparatus without operator assistance will inform operator of items available within a module or a location, and will provide instructions and direct an operator on how to obtain the items. The control system or Apparatus will interconnect all devices via one or combination of wired or wireless networks, and will use either one central controller, or distributed controllers to accomplish features described above.

Card

Card or Shopping Card with Embedded Electronics, Mechanical and Barcode Identifications Card with combination of properties, including: mechanical, electronics and barcode to create a unique combination of respective codes for added security and convenience. Although the illustration includes mechanical, electrical and barcode identification features, the invention also includes designs based on any two or one of the available features. In particular, the Mechanical Identification features, which could be used as the only identification method for a Card, represent on of the most cost effective identification features, and the invention offers a number of schemes listed below to enhance their ability for identification purposes. Location of all identification features on the Card are referenced in {X,Y} coordinates, in respect to Registration and/or Alignment feature embedded into the Card. Recognition Device designed to operate with a series of Cards, will have their respective sensors located outside the slot of the Recognition Device the Cards will be inserted in, and the Sensors position, which is also referenced in {X.Y} coordinates will be referenced to respective Registration and/or Alignment features embedded into the Card. Recognition Devices could have Sensors to detect all identification features of the Card inserted, or selected identification features of the Card inserted. Mechanical ID—are mechanical and property features of the Card and include:

a) Material of the Card. Special materials could be selected for manufacturing the Card or sections of the Card, and then recognized by respective sensors for proper identification. This will include—sections of conductive pads interconnected inside the Card to a number of embedded discrete resistive components. When the Card is inserted and aligned, the pads of the Card could be connected to respective pads of sensors of the Recognition Device, and resistance of the discrete components embedded inside the Card will be read by Controller connected to these sensors b) Layout and shape of the Card. The Card could be designed to a variety of shapes to distinguish a provider (store, etc.) from competition. Respective receptacles of Recognition Devices to read and recognize the Card—could be designed to accept physically the required shape of the Card. Standard self-alignment techniques are used to guide the Card during its insertion into a Recognition Devices c) Location and number of openings, such as holes, slots within the area of the Card, which could be recognized by electromechanical sensors, including: optical. For simplicity, round holes will be illustrated. Also, specific location on the Card selected for mechanical identification purposes, will be referenced as a hole made, or hole absent. Each hole position or X-Y coordinates could have a unique identification number, and the hole status could be represented by a binary logic: 1=hole in-place; 0=no hole. Identification holes will be used to create a unique binary code for each Card, as well as its equivalent decimal identification number based on binary logic formula of 2 in the power of N, where N—number of identifications holes with status. Similarly, the opposite identification could also be used based binary logic formula of 2 in the power of M, where M—number of identifications holes with status 0.

d) One or several Registration Holes and/or Optical Marks within the area of the Card, which are designed to verify alignment of the SHOPPING CARD during the insertion into a Recognition Device e) Color of the entire Card, or color combination of sections of the Card.

f) Special alignment grooves or channels for ease of insertion of the Card into and alignment with respective slots of a Card Recognition Device. The size, shape, orientation, number and materials of the alignment grooves or channels of the Card could be selected to provide reliable mating and engagement with respective channels or grooves inside the slot of the Card Recognition Devices.

g) Orientation marking in a form of an embedded arrow could be added to one or both sides of the Card, and indicate the direction of insertion into a slot of a Card Recognition Device.

h) As needed, a specific hole within identification holes embedded into a Card, could be used by Controller to mechanically prevent the Card from being removed (latched or locked in) from a slot of a Card Recognition device, after the Card has been previously inserted into. There could be several reasons for Controller to latch or lock a Card inserted into a slot of a Card Recognition Device, including: Card identification features not authorized by Controller to proceed with operation granting access to the Card holder (customer or provider); a process, such as a transaction, started or in-progress, requiring a specific function to be performed, such as scanning a barcode of an item removed from a product module; a process, such as configuration or maintenance of a Product Module. This type of hole embedded into a Card could be labeled as a latching hole. A solenoid installed at a Card Recognition device at a mating location, could be activated in real-time directly by Controller local or remote, and insert the solenoid shaft through the latching hole opening, physically preventing the Card from being removed from the slot. Then, as needed, Controller in real-time could de-activate the Solenoid and re-tract the shaft—allowing the Card to be removed from the slot it was inserted in.

Electronic ID—include: industry standard RFID; magnetic stripe; passive or active circuits, which are either attached to one of surfaces of the Card, or embedded into the body of the Card, and include features known to respective industry specifications. Example of a passive circuit would be two output pads interconnecting a number of discrete resistors connected in-parallel, forming a resistor network. Each resistor, when installed, will change the overall resistance presented at the output pads. Resistor could be of same value or different values. For simplicity, one value resistors are illustrated. Each resistor could have its address, numbered from the output pads it is connected to. The formula to calculate the total resistance presented at the output pads would be: R/N, where R—resistor value, and N—number of resistors installed and connected in-parallel to each other. Resistors could be embedded inside a Card, or attached to one or both sides of a Card. Surface mount resistors could be used. Since passive resistor network could be assembled using large resistors, accuracy if each resistor could be industry standard 1%, 5% or higher.

Barcode ID—industry standard barcodes, or provider specific barcodes, which are either attached to one of surfaces of the Card, or embedded into the body of the Card, and include features known to barcode specifications There could be several barcode labels embedded or attached to the Card, and their orientation could vary. For embedded barcodes, the respective section of the Card could be made our of transparent materials, such as clear plastic, so that the barcode embedded into this section could be identified by respective barcode readers from either side of the Card.

SHOPPING CARD could be activated or deactivated by local and/or remote Controller based on information obtained via Recognition Device the SHOPPING CARD was inserted in. Typical application:
a) SHOPPING CARD is activated by the local and/or remote Controller connected to the first Recognition Device within a Module where items could be purchased from.
b) SHOPPING CARD is then deactivated by the local and/or remote Controller connected to the first Recognition Device within a Module where items could be paid for, such as a Payment Module—ATM, SCO.

Out of all identification features described above, a specific number could be selected to ensure the SHOPPING CARD Cards are environmentally friendly, including: being recyclable; conveniently cleaned to remove bacteria, dirt. Example: SHOPPING CARDS configured with only mechanical identifications could be made out of recyclable materials, and allow to be dipped into a environmentally friendly solution for removal of: bacteria, dirt—before being used again.

Card Recognition Devices

A combination of controller and sensors designed to:
a) Allow physically insertion-removal of one SHOPPING CARD.
b) Reading all or selected identification features of the SHOPPING CARD, or reading specific identification features of the SHOPPING CARD, as instructed by Controller
c) Reporting identifications obtained from an inserted SHOPPING CARD to local and/or remote Controllers via wired or wireless network Special alignment grooves or channels embedded inside the slot of the Recognition Device are designed for ease of insertion and alignment of the Card to be inserted into the slot of a Card Recognition Device. The size, shape, orientation, number and materials of the alignment grooves or channels of the Recognition Device could be selected to provide reliable mating and engagement with respective channels or grooves of the Card. Recognition Devices are installed into Modules, such as: Automatic Vending Modules, Automated Product Modules, Payment Modules. When a Card is inserted into a Recognition Device of a Module, Controller connected to the Recognition Device will obtain identification (alignment, mechanical, electrical, barcode) information of the Card inserted, and based on this information will control access to the Module. Recognition Devices are also installed into entry or exit doors to a store, or section of a store. When a Card is inserted into a Recognition Device of a an entry or exit door, Controller connected to the Recognition Device will obtain identification (alignment, mechanical, electrical, barcode) information of the Card inserted, and based on this information will control access to or exit from respective store, or section of a store.

Recognition Devices are installed into Card Maintenance Modules. When a Card is inserted into a Recognition Device of a Card Maintenance Module, Controller connected to the Recognition Device will obtain identification (alignment, mechanical, electrical, barcode) information of the Card inserted, and based on this information and information available from the Data Base, or information provided by operator, enable or disable specific identification features of the Card at the entire store, or specific to a section of a store. Example: some identification features of a Card could be enabled to control access to specific Modules, or sections within a store, while other identification features of the same Card, could be enabled and control access to other specific Modules, or sections within a store. Recognition Devices are connected to Controller local or remote, and connection could be either wired or wireless. Recognition Devices will be monitored and controlled by respective Controller(s), providing Controller(s) with identification information obtained from inserted Cards to Controller, as requested, or as needed. Controller, based on information obtained from Recognition Devices and as instructed by operator, will in real-time program or instruct a Recognition Device, enabling specific sensors of the Recognition Device to perform identification of specific features of Cards inserted into the Recognition Device, and report selected identification features to Controller, as requested or needed. Controller, based on information obtained from Recognition Devices and as instructed by operator, will in real-time program or instruct a Recognition Device, disabling specific sensors of the Recognition Device to perform identification of specific features of Cards inserted into the Recognition Device. Recognition Devices could have all required sensors to detect all identification features available in a Card, or have specific sensors to detect specific identification features available in a Card. Recognition Device designed to operate with a series of Cards, will have their respective sensors located outside the slot of the Recognition Device the Cards will be inserted in, and the Sensors position will be referenced in {X.Y} coordinates, and will be referenced to respective Registration and/or Alignment features embedded into the Recognition Device and the series of Cards. Recognition Devices could have Sensors to detect all identification features of the Card inserted, or selected identification features of the Card inserted. As needed, Recognition Devices could have a solenoid which could be used by Controller to prevent the Card from being removed (latched or locked in) from a slot of a Card Recognition device, after it has been previously inserted into. The reason for latching or locking in a Card inserted into a slot of a Card Recognition Device will include: Card identification features not authorized by Controller to proceed with operation granting access to the Card holder (customer or provider). The type of hole embedded into a Card which could be used for latching the Card in, is labeled as a latching hole. A solenoid installed at a Card Recognition device at a mating location, could be activated in real-time directly by Controller local or remote, and insert the solenoid shaft through the latching hole opening, physically preventing the Card from being removed from the slot. Then, as needed, Controller in real-time could de-activate the Solenoid and re-tract the shaft—allowing the Card to be removed from the slot it was inserted in. Card Recognition device could be installed into a Module and used by Controller to authorize access to the Module, and record item transactions in/out of Module. Card Recognition device could be installed into a wall section next to a Module and used by Controller to authorize access to the Module, and record item transactions in/out of Module.

Controller

Control devices, including PC and embedded controllers, which could in real-time communicate via wired or wireless networks with devices described in the Apparatus of the invention, including Card Recognition Devices installed as stand-alone or inside of a Module. Controller could be configured locally or remotely by an operator or another Controller. Configuration could include: sensor status trigger points; time-based controls; optimization criteria such as minimum power consumption; security level in respect to access allowed to Customer and/or Provider. In respect to Apparatus, Controller depending on information obtained from sensor or other Controller could execute in real-time direct controls without operator assistance or indirect controls requested by an operator. In respect to Card Recognition Devices, Controller based on information obtained from Recognition Devices could execute in real-time direct controls without operator assistance or indirect controls requested by an operator, including:

a) Authorization of vending requested item or items via Automated Vending Module
b) Open/close doors to access items within Automated Product Storage Shelf
c) Obtained records from the Data Base, including Transaction Records
d) Submit records to the Data Base, including Transaction Records, which took place at a Module
e) Program or configure a Recognition Device to sensor specific features of a Card inserted into the Device, and report obtain information to Controller Controllers could communicate with other Controllers within specified location, and communicate with Controllers and/or computer outside specified location. Controllers local or remote could execute directly control commands in real-time based on information obtained from the inserted CARD into a Recognition Device connected to Controller, which could include: monitoring location of the Customer, analyzing time the Customer taken to complete a Transaction at a specific Module, allowing or disallowing access to a Module. In addition, Controllers could maintain inventory of items within a specified section or entire store by obtaining barcode information of items being loaded into Service Modules, unloaded or taken out of the Service Modules, items returned to Service Modules. Controllers could monitor status of each Service Module, and directly report or indicate the status locally at the Service Module, and/or at a remote location, such as supervisor room.

Controllers could execute directly controls, which could include: request to add specific items at a specific Service Module, monitor and control environment within a Service Module, allow access or stop access to a Service Module, depending on status of the Service Module, or status of a section within a store, or entire store. Controllers local or remote could de-activate a specific CARD, and disable its ability to operate one or more Service Modules within a section or entire store. Controllers could analyze performance of an activated CARD within a section or entire store, and link the information to a Customer identification obtained at the Payment Module or Identification Module. Controller could analyze transactions recorded in the data base pertaining to a specific or unique Card, and based on specified criteria characterize or classify the behavior pattern of the Card between Card activation and de-activation. Controller, at the Payment Module, could link behavior of the Card to a customer, who used the Card to purchase items.

Data Base

Non-volatile memory device, which could be located inside a Controller or as a stand-alone device connected to a network of Controllers, which could allow Controllers to store, retrieve, share information, as needed. Data Base will be used by Controllers to record and maintain data, including: all unique CARD Cards used at a location; identification features of each Card; assignment of each Card Identification Features to a specific location and/or Module; Transaction Records executed under each unique CARD within a location and/or within a specific Module; identification (barcode), description, price, weight and unit quantity of each Item within a location or store, section of a store, Modules within a store. Each Card within a location could be numbered in-series, and respective identification data for the Card and their assignment could be organized based on criteria, which could include: achieve optimal utilization of available memory space, minimize access time to store-retrieve data by Controllers, etc. The Data Base will be used by Controllers to store required information to automated the entire Transaction process within a store using Identification Features: embedded into CARD Cards; attached to Items inside the store; Module and Sections inside the store. Example of data stored by Controllers in the Data Base in respect to CARD Cards presented in Table 2 below. For simplicity: only 2 Cards listed to illustrate one of possible organizations of the Data Base.

TABLE 2

SHOPPING CARD unique Identification Features

| Card No. Feature ID → | Mechanical ID #1 1 | Mechanical ID #2 2 | Electronic ID #1 3 | Electronic ID #2 4 | Barcode ID 5 |
|---|---|---|---|---|---|
| 1 | Alignment Hole $(X=0, Y=0)$ | Single Row of ID holes Binary code: 00101110 $(X1, Y1)$ | Resistor Network 8 resistors in-parallel, 10K each Total value: 10K/4 = 250 Ohms Pad 1 - $(X2, Y2)$ Pad 2 - $(X3, Y3)$ | RFID Operating frequency F1 Range | Barcode code: 0001326001 $(X5, Y5)$ |
| 2 | Alignment Hole $(X=0, Y=0)$ | Single Row of ID holes Binary code: 10001110 $(X1, Y1)$ | Resistor Network 8 resistors in-parallel, 10K each Total value: 10K/2 = 500 Ohms Pad 1 - $(X2, Y2)$ Pad 2 - $(X3, Y3)$ | RFID Operating frequency F2 Range | Barcode code: 0001143003 $(X5, Y5)$ |

Coordinates {X,Y} of each Identification Feature could be recorded, as needed. In general, the Data Base will be used by Controller in real-time or as needed to store all parameters related to:
a) Physical components present at a location (store), including: Modules installed (ID, specifications, location, status); CARD series implemented (identification features embedded/enabled, specifications, assigned sections within a store, status);
b) CARD series implemented for the location (store), including: alignment and identification features embedded into the Card; each feature {X,Y} coordinate;
c) Each unique Card within a series of Cards, including: status of the Card; status of each identification feature;
d) Recognition Devices implemented for the location (store), including: location (Module, Access Door); Sensors installed (specification); Card alignment features implemented in the slot; Controller interface features;
e) Transaction history, which could be sorted by one or number of parameters, including: item ID, Card ID, Module ID, User ID, date, time.

The assignment of each Card Identification features for each Module and Area within a store is illustrated in Table 3.

TABLE 3

Assignment of SHOPPING CARD unique Identification Features

| Module, Area ID | Module, Area Description | Card ID Features | Comments - Card ID Features enabled |
|---|---|---|---|
| 1 | Store (entire area) | 1(1, 2, 4) 2(1, 2, 4) | Card 1: 1, 2, 4 Card 2: 1, 2, 4 |
| 2 | Automatic Vending Modules | 1(1, 2, 3, 5) 2(1, 2, 3, 5) | Card 1: 1, 2, 3, 5 Card 2: 1, 2, 3, 5 |
| 3 | Automated Product Modules | 1(1, 2, 5) 2(1, 2, 5) | Card 1: 1, 2, 5 Card 2: 1, 2, 5 |
| 4 | Section "Electronics" | 1(1, 2, 3, 4, 5) | Card 1: 1, 2, 3, 4, 5 Card 2: Disabled |

The Data Base could also be used by Controllers in real-time, or as needed, to store and retrieve information of items loaded into a Module, which will include: item barcode, weight, price.

Automatic Vending Module

Module configured of receiving and executing commands in real-time from local or remote Controllers, and depending on commands—either reject a customer from being served, or allow a customer to obtain items available for vending, and monitor items vended or considered by a customer. The Module contains Recognition Devices to accept and process SHOPPING CARD. The Module Controller will report information about inserted and detected CARD to central Controller, as requested. The Module Controller will report to central Controller information about Transactions within the Module completed under specific CARD, as requested. Environment inside the Module could be controlled by local or remote Controller. Inventory of items inside the Module is monitored by local or remote Controller via barcode reading sensors, providing information of items being placed into the Module and items taken out. Each Module could provide a variety of items. Module Controller local or remote could execute directly control commands in real-time based on information obtained from the inserted CARD, which could include: advancing certain items within the Module for immediate vending or dispensing as soon as requested by a Customer represented by the inserted CARD. Example—ADVS and AADVS systems submitted by the inventor, and on file at the USPTO under application Ser. No. 11/320,420, which could be used for vending a variety of pre-packaged items, including: prescription drugs, pre-packaged food. Automatic Vending Module will have at least one Recognition Device for accepting SHOPPING CARD Cards. Automatic Vending Module will have Recognition Device for accepting SHOPPING CARD Cards specific to a chain of stores, one store, section within a store, or sections within a store. Automatic Vending Module will have required automation devices, including barcode readers to identify: items being loaded into the Module; items dispensed during a Customer Transaction; items being returned back by a customer; items being returned to Provider. Automatic Vending Module could have a scale, which will be used by Controller to monitor the weight of items being loaded into the Module, and items being removed or vended-out from the Module. The Automatic Vending Module could be designed to accept only Cards with Mechanical Identifications. Module could be designed for containing only packaged Items identified by a label with a barcode. Modules could be designed to sustain environment inside, which is friendly to the items stored inside. In addition, anti-bacterial natural environmentally friendly ingredients could be added to sanitize and maintain bacteria-free environment surrounding items stored inside the Module. All these features, allow the Apparatus (Module) described in the invention—to achieve superior objectives in terms of: safety, security and efficiency in providing affordable and profitable service vs. existing methods. The Automatic Vending Module could be configured to provide self-diagnostics, such as: LED's, LCD, speakers. The self-diagnostics could be configured to perform specific function or functions, including: inform Customer and/or Provider of the Module status; direct sequence of steps required from Customer and/or Provider. The Automatic Vending Module could be configured to include electronic display, which could be used by local and/or remote Controller to execute controls in real-time, including: listing items inside the Module; instructions on how to use specific item; transaction records in-progress; advertisement. Automatic Vending Module will have a reject bin, where rejected items could be placed, as needed. The Reject Bin could have a scale measuring the combined weight of all items inside the Reject Bin, and report to Controller. Automatic Vending Module could be configured to contain several independent sections filled with items. Some or all sections could be configured as portable, allowing their loading with items at a remote location, and then transported to a store location and installed into a Module to make their items available for purchase by Customers. Portable section of a Module could be configured to have a Controller with non-volatile memory, and sensors connected to Controller for monitoring the environment surrounding items inside the section, and monitoring security of items inside the section. Module Controller could be configured to obtain environmental and security data from each portable section installed in the Module, and provide a report or a log to Provider and Customer, when requested. Module Controller based on environmental and security data could prevent a section with data out of environmental and security specifications from being installed into the Module, and inform Provider.

Automated Product Module

Module, which is configured to contain pre-packaged products with a product label that includes: barcode and/or RFID. The access to the products inside Module is controlled via automatic doors. The Module contains Recognition Devices to accept and process SHOPPING CARD. The Module Controller will report information about inserted and detected CARD to central Controller, as requested. The Module Controller could be configured in real-time by a remote Controller, and is capable of receiving and executing commands in real-time from local or remote Controllers, and depending on commands—either reject a customer from being served, or allow a customer to obtain items stored inside. Example—if customer is accepted, local or remote Controller could open the access door automatically or unlock the door and inform the customer that the door could be opened, to allow the customer to pick-up a merchandize. Automated Product Module will have required automation devices, including: barcode readers to identify items being taken out during a Customer Transaction, and items being returned back by a customer. The Module Controller will report to central Controller information about Transactions within the Module completed under specific CARD, as requested. Environment inside the Module could be controlled by local or remote Controller. Inventory of items inside the Module is monitored by local or remote Controller via barcode reading sensors, providing information of items being placed into the Module and items taken out. Each Module could provide a variety of items. Module Controller local or remote could execute directly control commands in real-time based on information obtained from the inserted CARD, which could include: advancing certain items within the Module for immediate access as soon as requested by a Customer represented by the inserted CARD. Automated Product Module could have a scale, which will be used by Controller to monitor the weight of items being loaded into the Module, and items being removed from the Module. Automated Product Module could have bins sitting over designated scales, which will be used by Controller to monitor the weight of items being: loaded into each bin; items being removed from the bin; items being returned back to the bin. The Automated Product Module could be designed or configured in real-time to accept only Cards with Mechanical Identifications. Module could be designed for containing only packaged Items identified by a label with a barcode. Modules could be designed to sustain environment inside, which is friendly to the items stored inside. In addition, antibacterial natural environmentally friendly ingredients could be added to sanitize and maintain bacteria-free environment surrounding items stored inside the Module. All these features, allow the Apparatus (Module) described in the invention—to achieve superior objectives in terms of: quality, safety, security and efficiency in providing affordable and profitable service vs. existing methods. The Automated Product Module could be configured to provide self-diagnostics, such as: LED's, LCD, speakers. The self-diagnostics could be configured to perform specific function or functions, including: inform Customer and/or Provider of the Module status; direct sequence of steps required from Customer and/or Provider. The Automated Product Module could be configured to include electronic display, which could be used by local and/or remote Controller to execute controls in real-time, including: listing items inside the Module; instructions on how to use specific item; transaction records in-progress; advertisement. Automated Product Module will have a reject bin, where rejected items could be placed, as needed. The Reject Bin could have a scale measuring the combined weight of all items inside the Reject Bin, and report to Controller. Reject bin could be configured to be shared by adjacent Modules. Automated Product Module could be configured to contain several independent sections filled with items. Some or all sections could be configured as portable, allowing their loading with items at a remote location, and then transported to a store location and installed into a Module to make their items available for purchase by Customers. Portable section of a Module could be configured to have a Controller with non-volatile memory, and sensors connected to Controller for monitoring the environment surrounding items inside the section, and monitoring security of items inside the section. Module Controller could be configured to obtain environmental and security data from each portable section installed in the Module, and provide a report or a log to Provider and Customer, when requested. Module Controller based on environmental and security data could prevent a section with data out of environmental and security specifications from being installed into the Module, and inform Provider.

Automated Payment Module

Is defined as Module, which is configured such as ATM or SCO, with addition of Recognition Devices to accept and recognize SHOPPING CARD. The Module Controller will report information about inserted and detected SHOPPING CARD to central Controller, as requested. The Module could obtain records from the central Controller related to all Transactions, which were previously recorded under SHOPPING CARD. Module Controller local or remote could execute directly control commands in real-time based on information obtained from the inserted SHOPPING CARD, which could include: greeting and directing the Customer (voice or visual display), pulling records from the Database of Transactions completed by the Customer represented by the inserted SHOPPING CARD. When a SHOPPING CARD is inserted into Automated Payment Station, and based on the Card identification data, information of all Transactions is retrieved by Controller from the Data Base—the customer will be presented with a comprehensive list or invoice of items the customer intends to purchase. The customer could: pay for all items; return selected items, and pay for the remaining items; return all items. After payment is completed, Controller will execute Transactions closing procedure, which will include: print out the receipt; label all Transactions in the Data Base under the Card as being processed; link respective Transactions to a customer ID, if authorized by the customer, which could be used for statistical analysis; de-activate inserted SHOPPING CARD and update its status in the Data Base; instruct the customer to remove the Card from the Recognition Device, and return de-activated Card to a provided location.

Identification Module

Module, which could be configured by Controller in real-time, and is designed to identify SHOPPING CARD, and provide information about the Customer identifications, such as: credit Card, bank Card, previously recorded history of transactions, etc.

Card Control Module

Module, which could be configured by Controller in real-time, and is designed to program, or activate or deactivate selected identification features of a SHOPPING CARD. Card Control Module could also be referenced as Card Maintenance Modules. Recognition Devices are installed into Card Maintenance Modules. When a Card is inserted into a Recognition Device of a Card Maintenance Module, Controller connected to the Recognition Device will obtain identification (alignment, mechanical, electrical, barcode) information of the Card inserted, and based on this information and information available from the Data Base, or information provided by operator, enable or disable specific identification features of the Card at the entire store, or specific to a section of a store. Example: some identification features of a Card could be enabled to control access to specific Modules, or sections within a store, while other identification features of the same Card, could be enabled and control access to other specific Modules, or sections within a store.

Controlled Access Section

Section access to which is controlled by a SHOPPING CARD

Reject Bin

Section allocated for accepting rejected items. Section could be installed within a Module containing Items, and could have a scale measuring and reporting to Controller combined weight of all items inside.

Service Module

Any of Modules within a section or entire store designed to provide a service to a customer and/or provider.

Transaction

Process, which includes: physical transfer of item into a Module, or out of Module by a customer and/or provider within a specified location using SHOPPING CARD, which is in real-time recorded, analyzed and stored by local and/or remote Controller in the Data Base as a value transaction, and is maintained in the database. From the point SHOPPING CARD is activated first at any Recognition Device within a designated location, all respective Transactions under this SHOPPING CARD are recorded and maintained. When SHOPPING CARD is processed by a payment station, including: ATM, SCO—it is deactivated, and all respective Transaction records are obtained by payment station or central Controller, and the customer using the SHOPPING CARD to obtain items will be required to pay for all items purchased per Transaction records.

DETAILED DESCRIPTION OF THE INVENTION

FIG. 1 through FIG. 4—illustrate example of configurations of the Apparatus for applications, including grocery stores. Configurations include: layout of Apparatus; selected devices; interface between devices. Each configuration is designed to meet specific store requirements, in terms of most efficient utilization of available resources, including: available space; energy; people, and provide the best quality at competitive prices to customers. The power distribution for the entire Apparatus could be implemented using patent-pending "plug-and-power" technology, submitted by the Applicant under UPSTO application Ser. No. 12/148,771. All modules of the apparatus, including illustrated Product Modules (600), and other devices shown—could be configured as illustrated and described on respective figures of this application. For simplicity, the layouts are for illustrating and describing selected features of the Apparatus, and not all devices or components of the Apparatus, including: Controllers, Shopping Card are shown. All devices of the Apparatus are configured to be connected to Controller via combination of wired and wireless LAN, including Internet. Product Modules (600) of the Apparatus could be configured as combination of Modules, consisting of Automated Product Modules and/or Automatic Vending Modules. Modules (600) could be configured as a single section, or configured to contain independent sections where items are stored. Modules could be configured as either: static; partially portable; or portable. Static Module, and all its sections, remains at a location where items could be loaded by Provider, and then purchased by Customer. Partially portable Module consist of sections, some of which are portable. Portable sections of a Module could be configured to be removed from the Module, and transported to a remote location for loading them with items. Loaded portable sections are then transported to store location and inserted into Module. For inventory purposes, and matching each portable section with respective Module, each Module and its sections could be configured to contain a unique barcode label, which will include: unique identification; specification parameters, such as: mating parameters for sections; location information. Modules and module sections are configured to include a Controller with non-volatile memory, and environmental and security sensors connected to Controller. Controller of the Module and of each section will be configured to monitor status of sensors, and record in the non-volatile memory any deviations from the set environmental and security specifications, including specifications for items stored inside the Module or section of the Module. Controller of a Module, and Controller of a section of a module, including: static, partially portable and portable, will monitor in real-time environmental and security deviations from set specifications. Module Controller could be configured to prevent sections of the Module to be installed when specifications, including: environment, security—are violated. Controllers of Modules and sections of Modules are configured to ensure the items stored inside them are maintained within specification parameters, including: environment; security; expiration date; and store this information in the non-volatile memory. Transactions could be configured to allow Customer and Provider to request a data log from Controller, which could be made available in an electronic format, and/or as a print-out report. Transportation vehicles used for delivering portable Modules or sections of Modules with items inside, could be configured to include secured and environmentally controlled chambers, configured to maintain items within specification requirements at all times. The apparatus, consisting of any combination of Modules, including: static, partially portable and portable, will ensure the items compliance to set specifications before presenting them for purchase by a Customer, with assurance reports available at the time of item transactions. The Controllers of the Apparatus are configured to maintain in real-time inventory information of: Modules; sections of Modules; items stored inside Modules and sections of Modules. The apparatus, as a system, is configured to ensure all items, which are made available for purchase to a Customer, retain their specifications. Controller could be configured to register and record in real-time an item transaction based on combination of either: barcode scan; weight change; barcode scan and weight change. For Modules containing only the same price and weight items, the weight change could be sufficient. In respect to Automatic Vending Module, described configurations are similar to configurations described in the applicant patent "Automatic Distributed Vending Systems", application Ser. No. 11/320,420, with portable sections described in this application represented by portable vending cartridges in the application Ser. No. 11/320,420.

FIG. 1—illustrates 3-D view of an Apparatus configured with Product Modules (600), with user interfaces installed into convenient location (611) on the wall partition by the module. Figure elements are labeled as follows:

511—Section restricted for Provider only, and authorized by Provider services. The section could be used for: storing inventory of items next to Product Modules where items are used; maintenance equipment; etc. Sections allocated for storing inventory of items will have controlled environment per item specifications. Loading or unloading of items into or form Product Modules (600) by Provider will require operator to scan item barcode label, allowing Controller to record respective transactions.

513—Section restricted for Customer and Provider, and authorized by Provider services. This section could be configured to provide the most pleasant environment, and support the most efficient shopping transactions.

601—Card reading device, which is configured to accept designated shopping Cards, and provide Controller with information which could be used by Controller to grant access to customer using the Card to items inside the Module (60). When Card is inserted, Controller will lock the Card inserted and via Card reader device will perform Card validation procedure. Once approved, Controller will inform the customer via available user interfaces (not shown for simplicity) that the Card is approved, and the Module is available for purchasing items stored inside. The apparatus could be configured as described in the application, to mechanically lock the Shopping Card, after the Card was inserted into a slot of a Card Reading device (601). When configured, the Card will be locked mechanically in the Card Reading device (601) at the start of transactions and during item transactions, and then unlocked when transactions are completed, or cancelled, or as directed by Controller. The locking of the Card inside the Card Reading device is accomplished by Controller activating an actuator, such as solenoid, which will extend its plunger through a designated opening in the Card, preventing mechanically the Card being removed from the slot. As needed, including upon completion of transactions executed using the Card identification features, Controller will de-activate the solenoid, which will retract its plunger, disengaging from the Card and allowing its removal from the slot. The hole embedded into a Card and used for locking could be labeled as a latching hole.

602—Barcode reading device connected to Controller. Barcode reading device could be configured to include: device installed in the Module; next to the Module. Customer could be allowed to use a portable barcode scanner, including the one as part of a mobile phone, which could be configured to connect via wireless LAN to store Controller. Controller in real-time, depending on certain factors, including: configuration set by provider; previously recorded shopping history—could select the Barcode reading device to confirm transaction of each item being removed from the Module or placed into the Module (600). When selected, customer or provider, will be required to scan the barcode label of the item either being removed out of or placed in Product Module (600).

603—Status Light configured for each Product Module (600). The Status Light is controlled by the local or remote Controller. The status of the Module, such as: Available (not in-use); Busy (in-use); In-service—could be indicated by the Status Light by changing its color: Green (available); Yellow (in-use); Red (in-service). The Status Light, as show, could be configured to incorporate an illuminated characters, representing: Module ID. The Status Light could be designed based on "Low-cost Illumination Device" filed by the Applicant with the USPTO under application Ser. No. 12/221,337.

604—Sliding door, preventing unauthorized access to Module (600). The sliding door could be operated manually by an authorized user (Customer or Provider), or automatically by Controller. In order to gain access to the Module (600), a Shopping Card described in this application, will need to be inserted into the Card Reading device (601), which will be used by Controller to verify the eligibility, and when confirmed—allow operation of the door.

605—Handle to operate Sliding door (604).

606—Display, which could be configured to allow local or remote Controller to display information related to: store, in general; nearest Product Module or Modules; item related data, including: inventory, specifications, applications; any other information selected by the store.

607—Partition walls configured to separate Provider section (511) of the store from Customer and Provider section (513). The layout of the walls and related accessories, such as: shelving's, bumpers, and their utilization—could be selected to provide ergonomically effective and efficient functions, including: section selected for user interfaces for each Product Module (600); sections selected for securing shopping cart.

608—Controller user interface for each Module (600) facing store (513). The interface could be configured to include: touch-screen, magnetic Card reader, and other devices required to authorize and complete item transactions.

609—Printer, which could be used to provide Customer with: receipt of transactions; item specifications; item quality report; other.

610—Direction along which the Sliding door (604) is moving to open and close the access to Module (600).

611—Section of (607) configured for installation of user interfaces devices.

Figure 2:
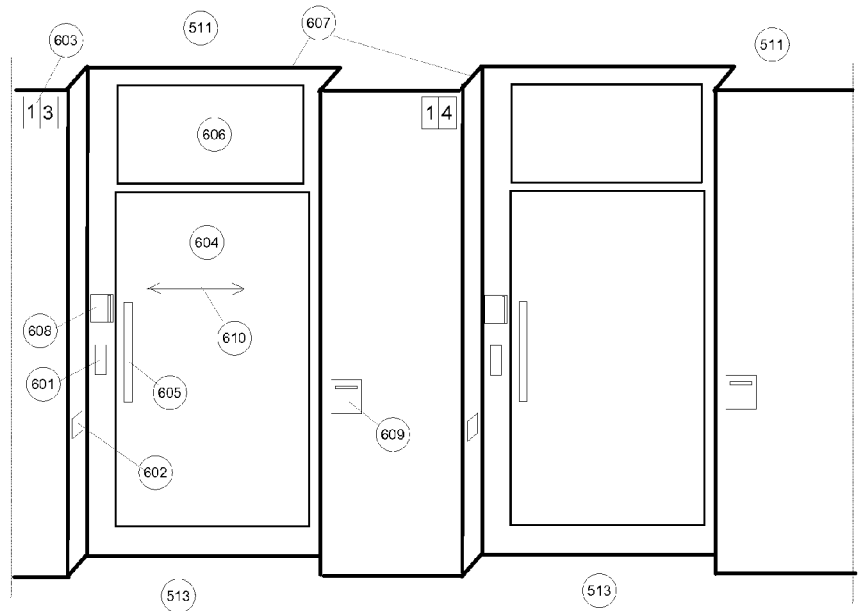

FIG. 2—illustrates 3-D view of an Apparatus configured with Product Modules (600), with user interfaces installed into convenient location on the Module (600) and in the wall partition by the module. Figure elements are labeled same as on FIG. 1.

Figure 3:
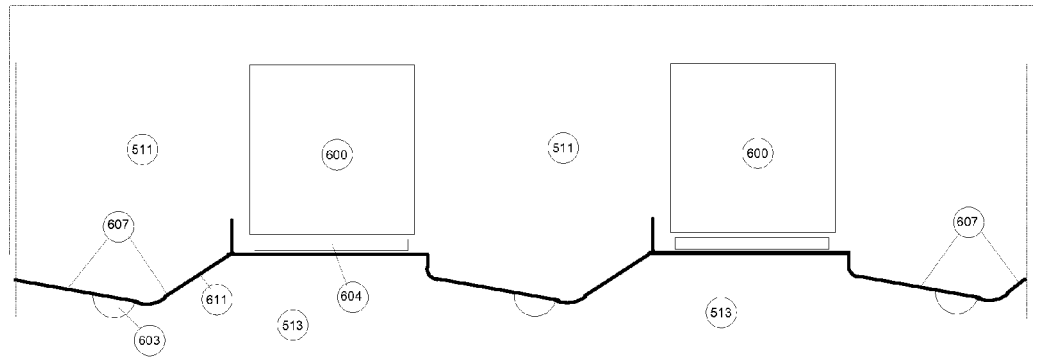

FIG. 3—Top view of an Apparatus described on FIG. 1. Figure elements are labeled same as on FIG. 1.

Figure 4:
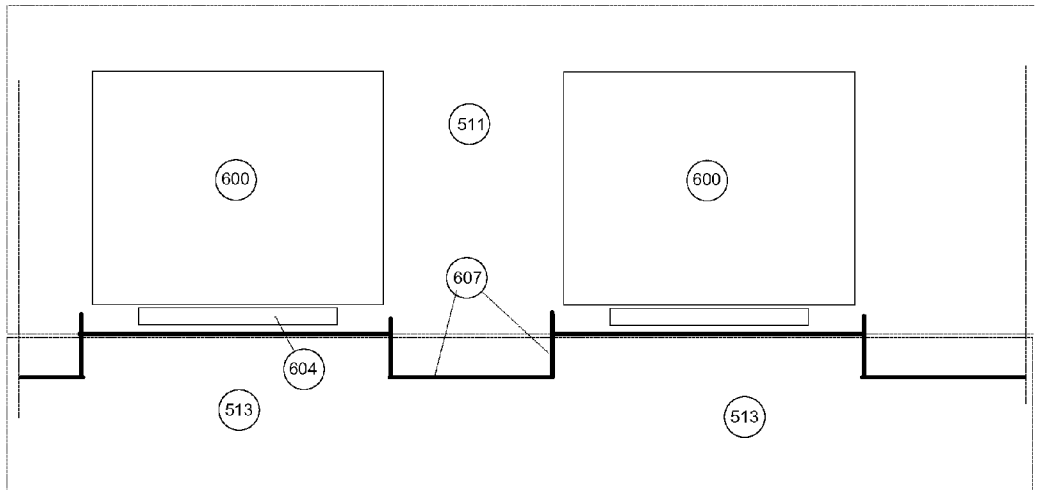

FIG. 4—Top view of an Apparatus described on FIG. 2. Figure elements are labeled same as on FIG. 2.

FIG. 5 through FIG. 15—illustrate configurations of a Card. The Card or Shopping Card configured with Embedded Electronics, Mechanical and Barcode Identifications Card with combination of properties, including: mechanical, electronics and barcode to create a unique combination of respective codes for added security and convenience. Although the illustrations include mechanical, electrical and barcode identification features, the invention also includes Card configurations based on any combination of available features described in the application. In particular, the Mechanical Identification features, which could be used as the only identification method for a Card, represent on of the most cost effective identification features, and the invention offers a number of schemes listed below to enhance their ability for identification purposes. Location of all identification features on the Card are referenced in {X,Y} coordinates, in respect to Registration and/or Alignment feature embedded into the Card. Recognition Device designed to operate with a series of Cards, will have their respective sensors located outside the slot of the Recognition Device the Cards will be inserted in, and the Sensors position, which is also referenced in {X.Y} coordinates will be referenced to respective Registration and/or Alignment features embedded into the Card. Recognition Devices could have Sensors to detect all identification features of the Card inserted, or selected identification features of the Card inserted.

Mechanical ID—are mechanical and property features of the Card and include:

a) Material of the Card. Special materials could be selected for manufacturing the Card or sections of the Card, and then recognized by respective sensors for proper identification. This will include—sections of conductive pads interconnected inside the Card to a number of embedded discrete resistive components. When the Card is inserted and aligned, the pads of the Card could be connected to respective pads of sensors of the Recognition Device, and resistance of the discrete components embedded inside the Card will be read by Controller connected to these sensors;

b) Layout and shape of the Card. The Card could be designed to a variety of shapes to distinguish a provider (store, etc.) from competition. Respective receptacles of Recognition Devices to read and recognize the Card—could be designed to accept physically the required shape of the Card. Standard self-alignment techniques are used to guide the Card during its insertion into a Recognition Devices;

c) Location and number of openings, such as holes, slots within the area of the Card, which could be recognized by electromechanical sensors, including: optical. For simplicity, round holes will be illustrated. Also, specific location on the Card selected for mechanical identification purposes, will be referenced as a hole made, or hole absent. Each hole position or X-Y coordinates could have a unique identification number, and the hole status could be represented by a binary logic: 1=hole in-place; 0=no hole. Identification holes will be used to create a unique binary code for each Card, as well as its equivalent decimal identification number based on binary logic formula of 2 in the power of N, where N—number of identifications holes with status. Similarly, the opposite identification could be used based binary logic formula of 2 in the power of M, where M—number of identifications holes with status 0;

d) One or several Registration Holes and/or Optical Marks within the area of the Card, which are designed to verify alignment of the SHOPPING CARD during the insertion into a Recognition Device;

e) Color of the entire Card, or color combination of sections of the Card;

f) Special alignment grooves or channels for ease of insertion of the Card into and alignment with respective slots of a Card Recognition Device. The size, shape, orientation, number and materials of the alignment grooves or channels of the Card could be selected to provide reliable mating and engagement with respective channels or grooves inside the slot of the Card Recognition Devices;

g) Orientation marking in a form of an embedded arrow could be added to one or both sides of the Card, and indicate the direction of insertion into a slot of a Card Recognition Device;

h) As needed, a specific hole within identification holes embedded into a Card, could be used by Controller to prevent the Card from being removed (latched or locked in) from a slot of a Card Recognition device, after the Card has been previously inserted into. There could be several reasons for Controller to latch or lock a Card inserted into a slot of a Card Recognition Device, including: Card identification features not authorized by Controller to proceed with operation granting access to the Card holder (customer or provider); a process, such as a transaction, started or in-progress, requiring a specific function to be performed, such as scanning a barcode of an item removed from a product module; a process, such as configuration or maintenance of a Product Module. This type of hole embedded into a Card could be labeled as a latching hole. A solenoid installed at a Card Recognition device at a mating location, could be activated in real-time directly by Controller local or remote, and insert the solenoid shaft through the latching hole opening, physically preventing the Card from being removed from the slot. Then, as needed, Controller in real-time could de-activate the Solenoid and re-tract the shaft—allowing the Card to be removed from the slot it was inserted in.

Electronic ID—include: industry standard RFID; magnetic stripe; passive or active circuits, which are either attached to one of surfaces of the Card, or embedded into the body of the Card, and include features known to respective industry specifications. Example of a passive circuit would be two output pads interconnecting a number of discrete resistors connected in-parallel, forming a resistor network. Each resistor, when installed, will change the overall resistance presented at the output pads. Resistor could be of same value or different values. For simplicity, one value resistors are illustrated. Each resistor could have its address, numbered from the output pads it is connected to. The formula to calculate the total resistance presented at the output pads would be: R/N, where R—resistor value, and N—number of resistors installed and connected in-parallel to each other. Resistors could be embedded inside a Card, or attached to one or both sides of a Card. Surface mount resistors could be used. Since passive resistor network could be assembled using large resistors, accuracy if each resistor could be industry standard 1%, 5% or higher.

Barcode ID—industry standard barcodes, or provider specific barcodes, which are either attached to one of surfaces of the Card, or embedded into the body of the Card, and include features known to barcode specifications There could be several barcode labels embedded or attached to the Card, and their orientation could vary. For embedded barcodes, the respective section of the Card could be made our of transparent materials, such as clear plastic, so that the barcode embedded into this section could be identified by respective barcode readers from either side of the Card.

SHOPPING CARD could be activated or deactivated by local and/or remote Controller based on information obtained via Recognition Device the SHOPPING CARD was inserted in. Typical application: a) SHOPPING CARD is activated by the local and/or remote Controller connected to the first Recognition Device within a Module where items could be purchased from; b) SHOPPING CARD is then deactivated by the local and/or remote Controller connected to the first Recognition Device within a Module where items could be paid for, such as a Payment Module—ATM, SCO.

Out of all identification features described above, a specific number could be selected to ensure the SHOPPING CARD Cards are environmentally friendly, including: being recyclable; conveniently cleaned to remove bacteria, dirt. Example: SHOPPING CARDS configured with only mechanical identifications could be made out of recyclable materials, and allow to be dipped into a environmentally friendly solution for removal of: bacteria, dirt—before being used again. Shopping Card could be configured with embedded local controller to support user interfaces embedded into the Card, and interface with remote Controller over wireless LAN for centralized communications and controls, including support of real-time navigation of the Customer by Controller based on customer selected Shopping List.

Figure 5:
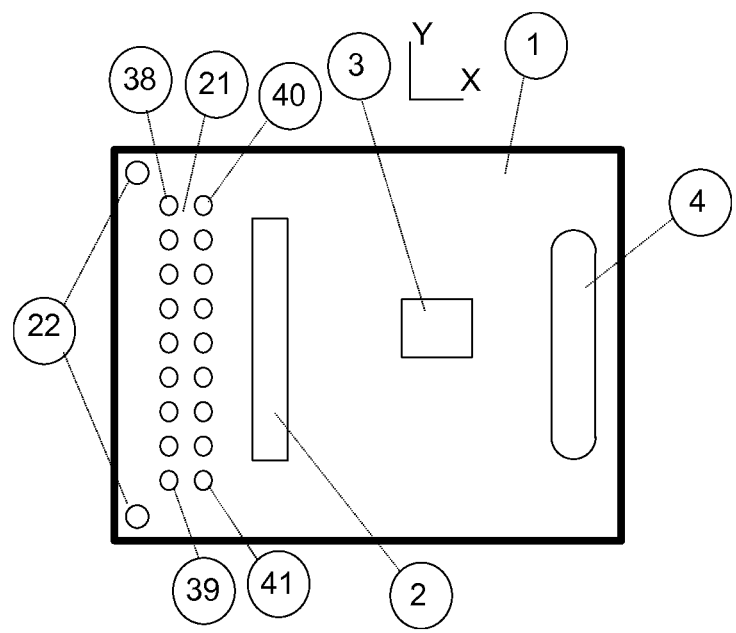

FIG. 5—Example of a Card configured with Embedded Electronics, Mechanical and Barcode Identifications. In this example the Card (1) has combination of identification properties: mechanical; electronics; and barcode, which all together will create a unique combination of respective codes for added security and convenience. Although the illustration includes mechanical, electronics and barcode identification features, the invention includes designs based on any two or one of the available features. Mechanical identifications include:

a) Material of the Card. Special materials could be selected for manufacturing the Card or sections of the Card, and then recognized by respective sensors for proper identification.
b) Layout and shape of the Card. The Card is designed to have a rectangular shape, and size could be selected to further distinguish its properties. Small Card could fit into a pocket, and without additional tracking devices, could be taken out of a provider's location (store) without authorization. Larger size Cards will not fit into pockets, and could be carried like a badge. Larger size Cards is easier to keep track off (visually), and is hard to remove from provider's location (store) without authorization.
c) Location and number of openings, such as holes, slots within the area of the Card, which could be recognized by electromechanical sensors, including: optical. The Card has two alignment or registration holes (22), which will allow to verify the Card position when it is inserted into a Card Recognition Device. The Card has also a dual column of identifications holes (21), with 9 holes in each column. In this particular example—both columns are populated with maximum number of holes. Each hole has a unique $\{X,Y\}$ coordinate, and is numbered from the top of the column on the left (38) down to the bottom of the column (39), and then continued to the top (40) of column on the right down to the bottom (41) of the column. Method of numbering could vary. Mathematically, the maximum number of holes available for identification purposes is based on the binary (0,1) identification formula of 2 in the power of N, where N—is the maximum number of holes. In this example—there is maximum of 18 holes, representing 2 to the power of 18, resulting in maximum of 262144 unique combinations. The other approach, is to consider each column as a unique combination of 9 holes, or 2 to the power of 9 which is 512 unique combinations for each column. The selected: number of columns, holes per column, hole sizes, distance between columns, distance between holes—could be designed to provide the most effective and efficient mechanical identification and recognition. Note, that location $\{X, Y\}$ coordinates of each hole implemented or purposely left blank (no hole)—is registered by the design, and respective Recognition Devices are designed to have sensors placed accordingly and to detect the presence of identification holes implemented and/or absence when purposely left blank. For any series of Cards to be used within a specified location, the $\{X,Y\}$ coordinates of holes present and absent—are maintained in the same location. As result, if hole #1 is present—it will be in the same location for all Cards in the series. The respective coordinates for hole #1 $\{X1,Y1\}$ will be labeled as having binary "1". If hole #1 is not present, the respective coordinates $\{X1,Y1\}$ will be labeled as having binary "0". Same applies to all other locations, where a hole could be present or not. As result, the mechanical identification based on openings being present or absent at specified locations, could be described in respective coordinates as follows: Mechanical ID #1=$\{X1,Y1\}$=1 (if hole is present) or =0 (if not); Mechanical ID #2=$\{X2,Y2\}$=1 (if hole is present) or =0 (if not); and so on till the last coordinate Mechanical ID #18=$\{X18,Y18\}$=1 (if hole is present) or = 0 (if not). This method for using mechanical identification holes could be applied to all designs of the SHOPPING CARD.
d) Color of the entire Card, or color combination of sections of the Card could be designed to further distinguish the Card. Example, within a store, there could be Cards of the same shape, but different color—signifying their use for a particular section of the store
e) Physical properties, such as: fabrication materials, outer or inner layers of the Card or sections of—could be used or embedded to further distinguish the Card features and properties. Identification openings could be grouped, numbered, referenced in X-Y coordinate system, and treated as binary to indicate their status as binary "1" hole is present at specified location, and "0"—hole is absent at the specified location. Identification openings could represent patterns, unique for each Card. Location of each identification opening could be referenced as a number—"1, 2, 3, etc." and/or by its $\{X, Y\}$ coordinates, such as: $\{1, 0.5\}$, $\{0.2, 1.125\}$. Coordinates $\{X, Y\}$ could be referenced to alignment holes (22), and/or alignment marks available on the Card, and measurement units could include: Metric, English. Location of all Card identifications: mechanical, electronic, barcode—could be referenced in $\{X, Y\}$ coordinate system to alignment holes, and/or alignment marks available on the Card, and measurement units could include: Metric, English.
f) Special alignment grooves or channels for ease of insertion of the Card into and alignment with respective slots of a Card Recognition Device. The size, shape, orientation, number and materials of the alignment grooves or channels of the Card could be selected to provide reliable mating and engagement with respective channels or grooves inside the slot of the Card Recognition Devices.
g) Orientation marking in a form of an embedded arrow could be added to one or both sides of the Card, and indicate the direction of insertion into a slot of a Card Recognition Device. Electronic Identification (3) includes:
a) RFID, which could be designed to operate within required range b) Magnetic stripe, industry standard technology, which is used for credit and debit Cards which are either attached to one of surfaces of the Card, or embedded into the body of the Card, and include features known to respective industry specifications.

Barcode Identification (2) includes—industry standard barcodes, or provider specific barcodes, which are either attached to one of surfaces of the Card, or embedded into the body of the Card, and include features known to barcode specifications.

Location of all identification features on the Card are referenced in {X,Y} coordinates, in respect to Registration and/or Alignment feature embedded into the Card. Recognition Device designed to operate with a series of Cards, will have their respective sensors located outside the slot of the Recognition Device the Cards will be inserted in, and the Sensors position, which is also referenced in {X.Y} coordinates will be referenced to respective Registration and/or Alignment features embedded into the Card. Recognition Devices could have Sensors to detect all identification features of the Card inserted, or selected identification features of the Card inserted. The Card could be activated or deactivated by local and/or remote Controller based on information obtained via Recognition Device the Card was inserted in. Typical application:

a) SHOPPING CARD is activated by the local and/or remote Controller connected to the first Recognition Device within a Module where items could be purchased from.
b) SHOPPING CARD is then deactivated by the local and/or remote Controller connected to the first Recognition Device within a Module where items could be paid for, such as a Payment Module—ATM, SCO.

The Card (1) designed with identification features illustrated on FIG. 5—allows to create a number or a series of Cards based on selected designs, by altering respective identification parameters within their design features, which include: number of actual holes embedded; barcode embedded or attached; RFID tag embedded or attached. In all descriptions of illustrations of available configurations of a Card —descriptions of a design of a Card, unless noted otherwise, apply to a series of Cards, which have the same designed identification features, but all are unique Cards due to variations of specific identification parameters for every Card to distinguish any Card within the series from the remaining Cards in the series. Figure elements are labeled as follows:

1—Card with Embedded Electronics, Mechanical and Barcode Identifications
2—Barcode attached or embedded into the Card
3—RFID tag attached or embedded into the Card. The RFID tag will allow RFID sensors and RFID monitoring devices to report to Controller information in respect to physical presence or location of the Card. Information obtained by Controller from RFID sensors and RFID monitoring devices via RFID tag attached to the Card, could be used by Controller for:
  a) Additional verification of the identification of the Card
  b) Monitoring position of the Card within a designated location
  c) Prevent the Card from entering a designated location
  d) Prevent the Card from exiting a designated location
4—Slot, as a convenience, for holding the Card and/or attaching a carrying string, which could conveniently fit over the customer neck, etc.
21—Identification holes
22—Alignment holes
38—Starting number of Identification Holes increasing in the order down to the bottom of the column (39) and then continued with the top (40) of the second column and down to the bottom (41) of the column. Numbers assigned to each hole could vary. In the example; (38) represents location with identification as #1, (39)—#9, (40)—#10, (41)—#18. In this example—all locations from #1 through #19 do have holes, or binary status "1".

Figure 6:
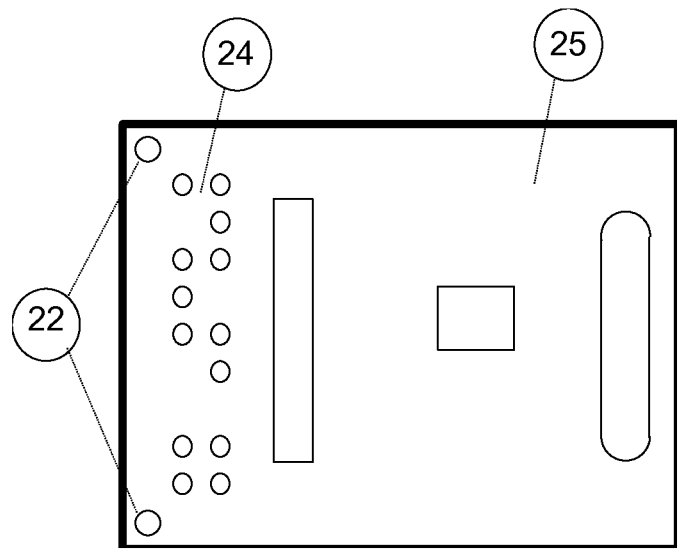

FIG. 6—Example of a Card design from the series of Card designs illustrated on FIG. 5. In this particular example, the number of identification holes equal to 13, and holes are made at the following locations: 1, 3, 4, 5, 8, 9, 10, 11, 12, 14, 15, 17, 18. Using binary logic, the unique binary code for this Card: 101110011111011011. Figure elements are labeled same as on FIG. 5.

Figure 7:
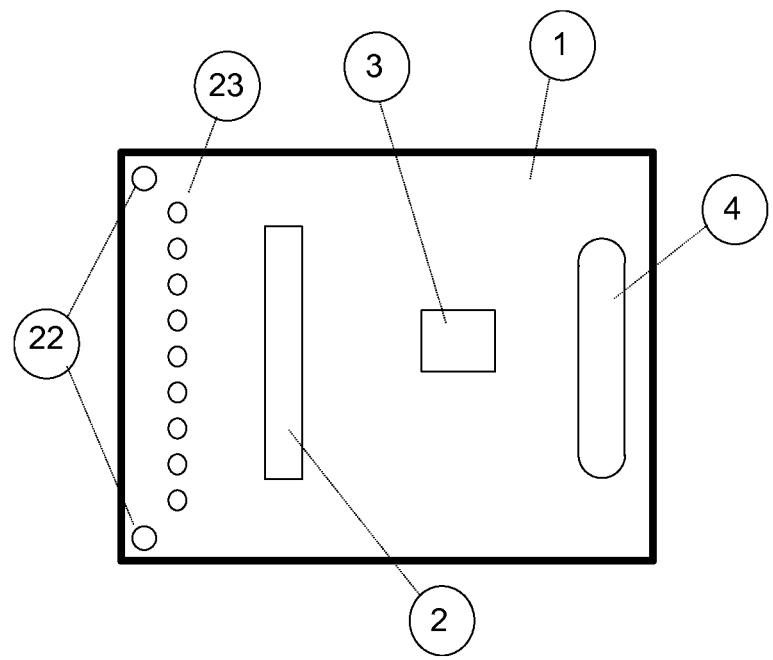

FIG. 7—Example of a Card design similar to the series of Card designs illustrated on FIG. 5 with an exception where only one column is used for identification holes. In this particular example, the number of identification holes equal to 9, and holes are made at the following locations: 1, 2, 3, 4, 5, 6, 7, 8, 9. Using binary logic, the unique binary code for this Card: 111111111.

Figure elements are labeled same as on FIG. 5.

Figure 8:
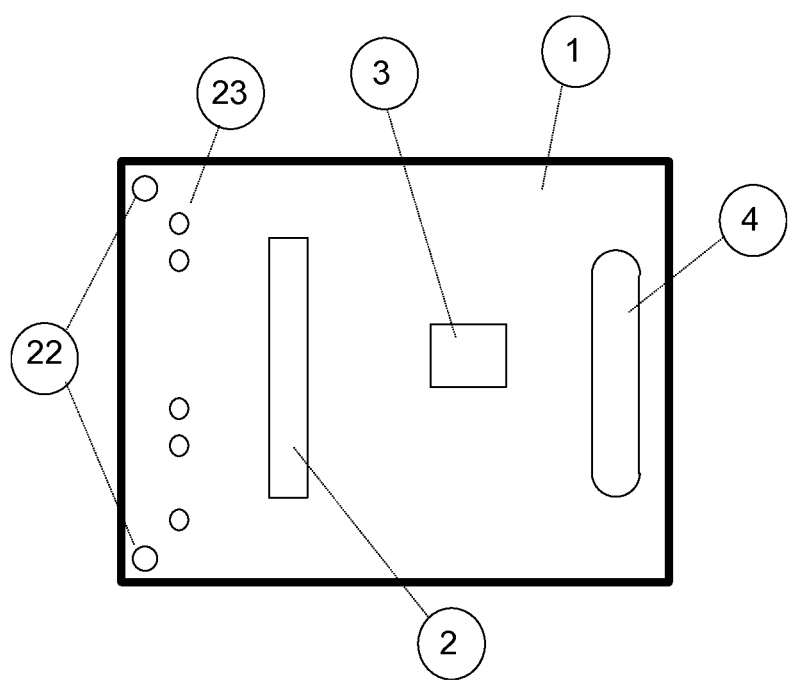

FIG. 8—Example of a Card design from the series of Card designs illustrated on FIG. 7. In this particular example, the number of identification holes equal to 9, and holes are made at the following locations: 1, 2, 6, 7, 9. Using binary logic, the unique binary code for this Card: 110001101. Figure elements are labeled same as on FIG. 5

Figure 9:
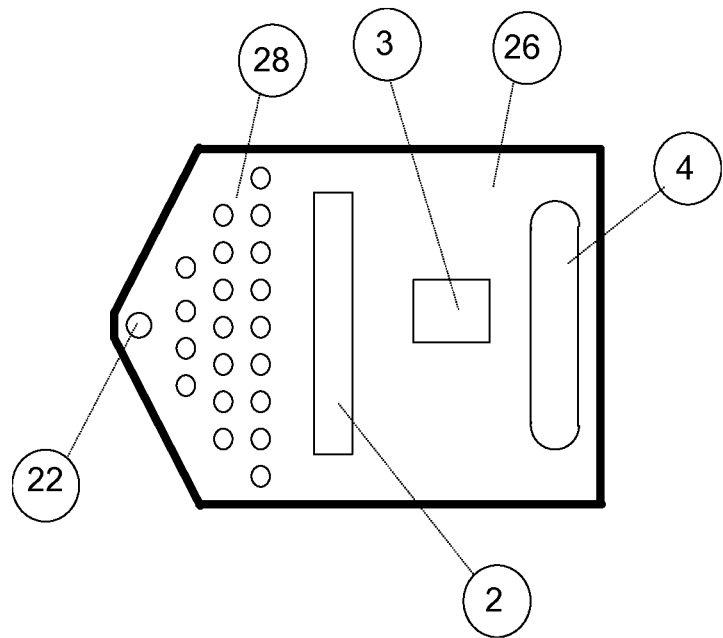

FIG. 9—Example of a Card (26) design with a front section formed as a triangle, and three columns used for identification holes. The first column has 4 holes, the 2-nd column has 7 holes and the 3-rd column has 9 holes. Each hole has a unique {X.Y} coordinate.

Location of all identification features on the Card are referenced in {X,Y} coordinates, in respect to Registration and/or Alignment feature embedded into the Card. Recognition Device designed to operate with a series of Cards, will have their respective sensors located outside the slot of the Recognition Device the Cards will be inserted in, and the Sensors position, which is also referenced in {X.Y} coordinates will be referenced to respective Registration and/or Alignment features embedded into the Card. Recognition Devices could have Sensors to detect all identification features of the Card inserted, or selected identification features of the Card inserted.

Figure elements are labeled as follows:
28—section of the Card (26) allocated for identification holes, arranged in a 3-column formation Remaining elements are labeled same as on FIG. 5.

Figure 10:
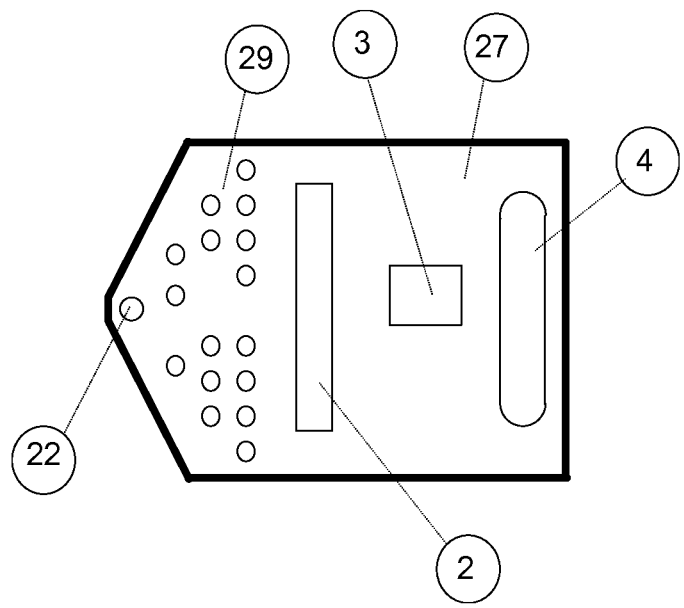

FIG. 10—Example of a Card (27) design illustrated on FIG. 5. In this particular example, the first column has 3 holes, the 2-nd column—5 holes, the 3-rd column—8 holes.
(27) from the series of Card designs illustrated on FIG. 7.
29—section of the Card (27) allocated for identification holes, arranged in a 3-column formation Remaining figure elements are labeled same as on FIG. 5.

Figure 11:
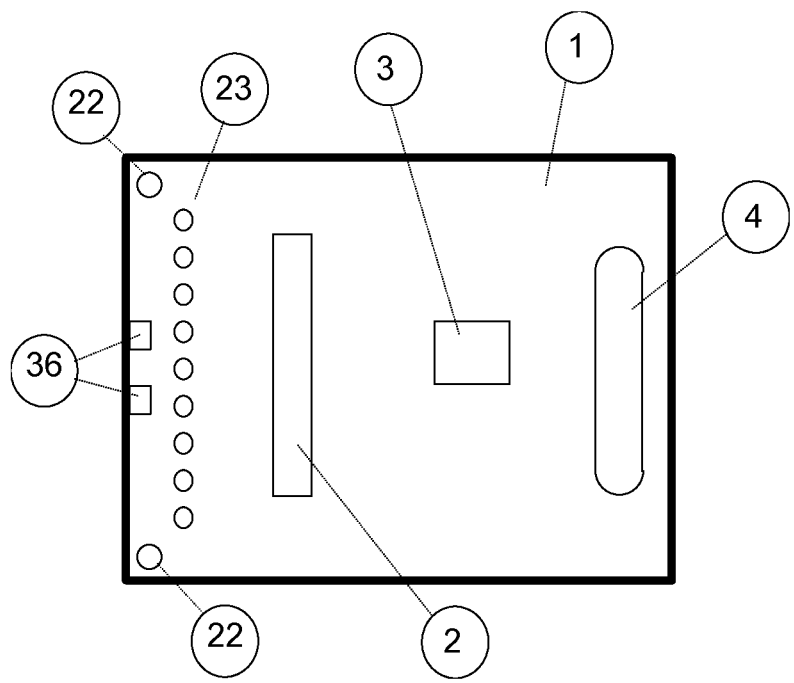

FIG. 11—Illustrates SHOPPING CARD (1), similar to the one presented on FIG. 7, but with addition of an electronic identification feature in a form of conductive pads (36), which are connected to a resistive network embedded into the body of the Card (1). Example of a passive circuit would be two output pads interconnecting a number of discrete resistors connected in-parallel, forming a resistor network. Each resistor, when installed, will change the overall resistance presented at the output pads. Resistor could be of same value or different values. For simplicity, one value resistors could be used. Each resistor could have its address, numbered from the output pads it is connected to. The formula to calculate the total resistance presented at the output pads would be: R/N, where R—resistor value, and N—number of resistors installed and connected in-parallel to each other. Resistors could be embedded inside a Card, or attached to one or both sides of a Card. Surface mount resistors could be used. Since passive resistor network could be assembled using large resistors, accuracy if each resistor could be industry standard 1%, 5% or higher. Location of all identification features on the Card (1) are referenced in {X,Y} coordinates, in respect to Registration and/or Alignment feature embedded into the Card. Recognition Device designed to operate with a series of Cards (1), will have their respective sensors located outside the slot of the Recognition Device the Cards will be inserted in, and the Sensors position, which is also referenced in {X.Y} coordinates will be referenced to respective Registration and/or Alignment features embedded into the Card. Recognition Devices could have Sensors to detect all identification features of the Card inserted, or selected identification features of the Card inserted. When a Card (1) is inserted into respective Recognition Device, Controller local or remote will verify the Card (1) alignment inside the slot of the Recognition Device by reading status of Sensors monitoring location of the alignment holes (22). Controller could indicate the Card (1) alignment status via local LED's mounted next to the slot the Card (1) is inserted in. Controller then will verify other identification features embedded into the Card (1), including reading status of Sensors connected to pads (36), which will report the total resistance measured between pads (36). If all identification features of the Card (1) have been verified by Controller, Controller will authorize the user of the Card (1) to proceed with intended operation. If any of the required or expected identification features fail—Controller will reject customer from proceeding with intended operation, and inform provider of a problem.

Remaining components are labeled same as on FIG. 7.

Figure 12:
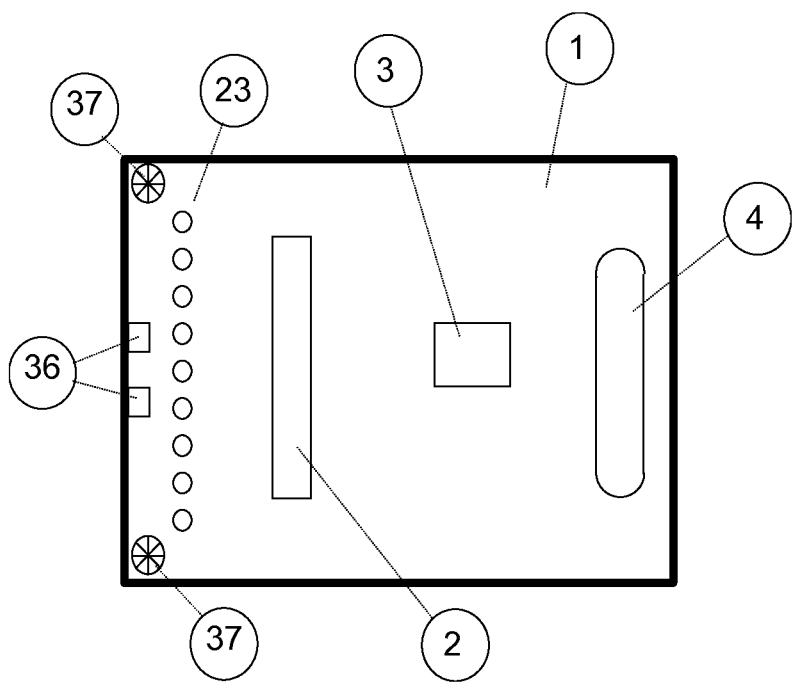

FIG. 12—Illustrates a SHOPPING CARD similar to the one on FIG. 11, except the alignment holes (22) are replaced with alignment marks (37). Remaining components are labeled same as on FIG. 11.

Figure 13:
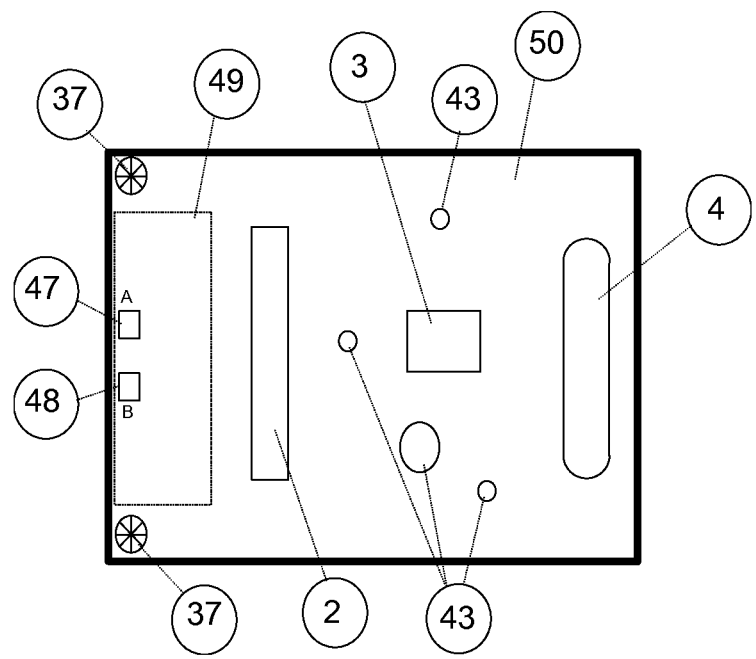

FIG. 13—Illustrates a SHOPPING CARD (52), which is designed to include: alignment groove (54); alignment hole (57), embedded barcode (60) and handle slot (56). The alignment groove (54) will point the direction (52) and will mate with respective slots of a Card Recognition Device. The size, shape, orientation, number and materials of the embedded alignment grooves or channels of the Card could be selected to provide reliable mating and engagement with respective channels or grooves inside the slot of the Card Recognition Devices.

Figure 14:
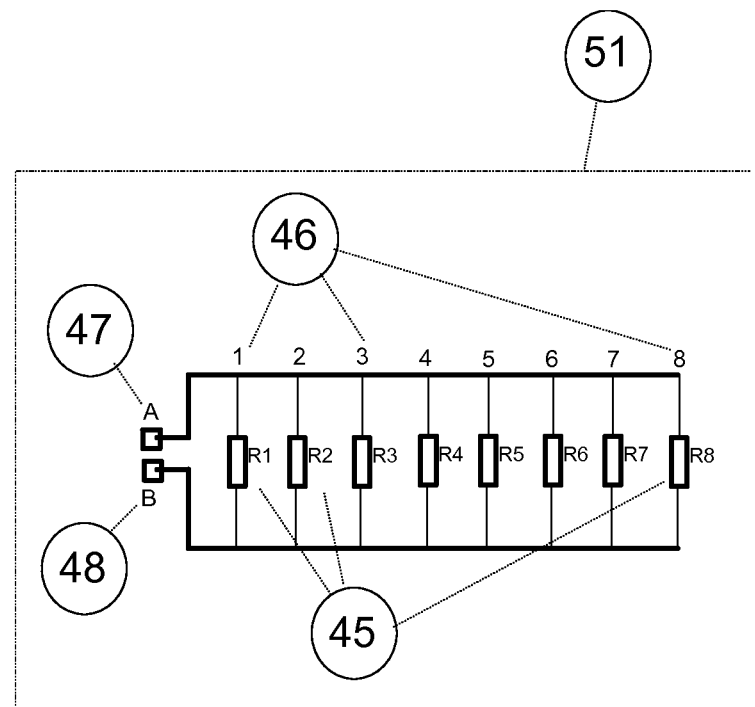

FIG. 14—Illustrates a wiring schematic of resistive network consisting of: 8 resistors (45), connected in-parallel, with each resistor location labeled 1 through 8 (46), and the total resistance present at the terminal pads A (47) and B (48). For example, if all resistor are equal to 100K, the total resistance, which could be measured between terminal pads A and B is equal to: 100K/N, where N—is a number of resistors installed. As shown, all 8 resistors are installed, making the total resistance between pads A and B equal to: 100,000/8=12,500 Ohms, or 12.5 KOhms.

Figure 15:
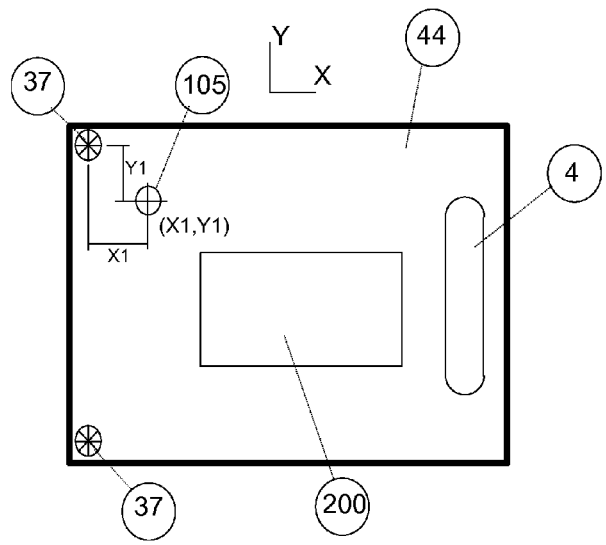

FIG. 15—Illustrates a SHOPPING CARD configured with a designed hole (105) located at specific location {X1,Y1} coordinates in respect to alignment marks (37), and with user interface (200). As needed, the hole (105) embedded into a Card, could be used by Controller to prevent the Card from being removed (latched or locked in) from a slot of a Card Recognition device, after it has been previously inserted into. The Controller could be configured for latching or locking in a Card inserted into a slot of a Card Recognition Device for a variety of reasons, including: Card identification features not authorized by Controller to proceed with operation granting access to a Module or section of a store to the Card holder (customer or provider); for allowing authorized transactions to proceed while the Card is locked-in. This type of hole embedded into a Card could be labeled as a latching hole. A solenoid installed at a Card Recognition device at a location aligned with the latching hole of an inserted Card into the slot of the Card Recognition device, could be activated in real-time directly by Controller local or remote, and extend its plunger or solenoid shaft through the latching hole opening, physically preventing the Card from being removed from the slot. Then, as needed, Controller in real-time could de-activate the solenoid and re-tract the plunger or shaft—allowing the Card to be removed from the slot it was inserted in. The user interface (200) could be configured as described on FIG. 31 and FIG. 32. Remaining components are labeled same as on FIG. 13.

FIG. 16 through FIG. 21—illustrate Apparatus configurations with a variety of devices in support of store applications.

Figure 16:
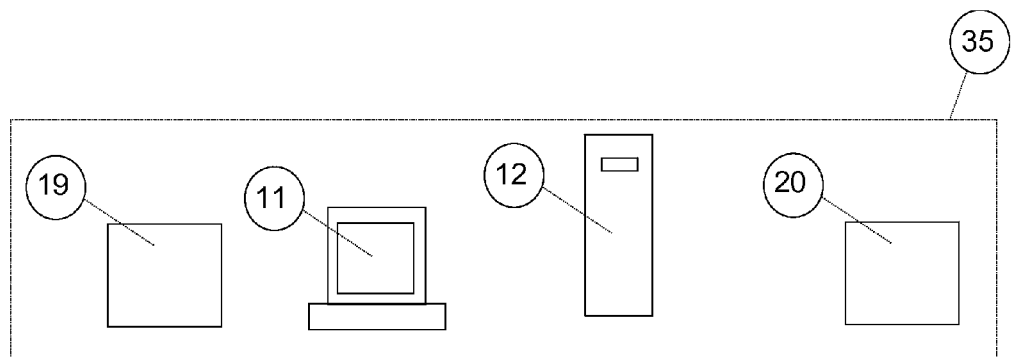

FIG. 16—illustrates control room section (35) of the Apparatus described in the invention, which includes:

11—Controller, which could be used as a central Controller for: real-time monitoring, analyzing and controlling activities and Transactions taking place within a designated area assigned to Controller.

Control devices, including PC and embedded controllers, which could communicate with Recognition Devices via wired or wireless networks, and which based on information obtained from Recognition Devices could execute directly or indirectly real-time controls, including:

a) Authorization of vending requested item or items via Automated Vending Module b) Open/close doors to access items within Automated Product Storage Shelf c) Obtained records from the Data Base, including Transaction Records d) Submit records to the Data Base, including Transaction Records, which took place at a specific Module e) Program a Recognition Device to sensor specific features of a Card inserted into the Device, and report obtain information to Controller Controllers could communicate with other Controllers within specified location, and communicate with Controllers and/or computer outside specified location. Controllers local or remote could execute directly control commands in real-time based on information obtained from the inserted CARD into a Recognition Device connected to Controller, which could include: monitoring location of the Customer, analyzing time the Customer taken to complete a Transaction at a specific Module, allowing or disallowing access to a Module. In addition, Controllers could maintain inventory of items within a specified section or entire store by obtaining barcode information of items being loaded into Service Modules, unloaded or taken out of the Service Modules, items returned to Service Modules. Controllers could monitor status of each Service Module, and directly report or indicate the status locally at the Service Module, and/or at a remote location, such as supervisor room. Controllers could execute directly controls, which could include: request to add specific items at a specific Service Module, monitor and control environment within a Service Module, allow access or stop access to a Service Module, depending on status of the Service Module, or status of a section within a store, or entire store. Controllers local or remote could de-activate a specific CARD, and disable its ability to operate one or more Service Modules within a section or entire store. Controllers could analyze performance of an activated CARD within a section or entire store, and link the information to a Customer identification obtained at the Payment Module or Identification Module 12—None-volatile memory device, as Data Base, connected to Controller (11) and used by Controller to store and retrieve information related to: items identifications (barcode, weight, price) within designated location; activities and Transactions executed using SHOPPING CARD Cards. Data Base will be used by Controllers to record and maintain data, including: all unique CARD Cards used at a location; identification features of each Card; assignment of each Card Identification Features to a specific location and/or Module; Transaction Records executed under each unique CARD within a location and/or within a specific Module; identification (barcode), description, price, and unit quantity of each Item within a location or store, section of a store, Modules within a store. Each Card within a location could be numbered in-series, and respective identification data for the Card and their assignment could be organized based on criteria, which could include: achieve optimal utilization of available memory space, minimize access time to store-retrieve data by Controllers, etc. The Data Base will be used by Controllers to store required information to automated the entire Transaction process within a store using Identification Features: embedded into CARD Cards; attached to Items inside the store; Module and Sections inside the store.

19—RFID Controller for monitoring respective RFID devices or RFID tags within a designated area, which are attached or embedded into components, such as: Items, SHOPPING CARD Cards, Modules. RFID sensors and RFID monitoring devices will monitor RFID tags embedded into the Cards, and report to Controller information in respect to physical presence or location of the Card. Information obtained by Controller from RFID sensors and RFID monitoring devices via RFID tag attached to the Card, could be used by Controller for:
  a) Additional verification of the identification of the Card
  b) Monitoring position of the Card within a designated location
  c) Prevent the Card from entering a designated location
  d) Prevent the Card from exiting a designated location 20—SHOPPING CARD Control Module.

Card Control Module is designed to program, or activate or deactivate selected identification features of a SHOPPING CARD. Card Control Module could also be referenced as Card Maintenance Modules. Recognition Devices are installed into Card Maintenance Modules. When a Card is inserted into a Recognition Device of a Card Maintenance Module, Controller connected to the Recognition Device will obtain identification (alignment, mechanical, electrical, barcode) information of the Card inserted, and based on this information and information available from the Data Base, or information provided by operator, enable or disable specific identification features of the Card at the entire store, or specific to a section of a store. Example: some identification features of a Card could be enabled to control access to specific Modules, or sections within a store, while other identification features of the same Card, could be enabled and control access to other specific Modules, or sections within a store. Recognition Device designed to operate with a series of Cards, will have their respective sensors located outside the slot of the Recognition Device the Cards will be inserted in, and the Sensors position will be referenced in {X.Y} coordinates will be referenced to respective Registration and/or Alignment features embedded into the Recognition Device and the series of Cards. Recognition Devices could have Sensors to detect all identification features of the Card inserted, or selected identification features of the Card inserted.

Figure 17:
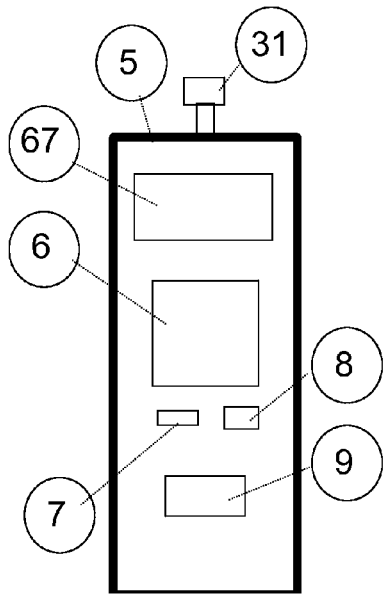

FIG. 17—Illustrates Item Automatic Vending Module (5), which includes: User Interface (6), RFID reader (8), Card Recognition Device (7). The Module could be designed to accept only Cards with Mechanical Identifications. Module could be designed for containing only packaged Items identified by a label with a barcode. Modules could be designed to sustain environment inside, which is friendly to the items stored inside. In addition, anti-bacterial natural environmentally friendly ingredients could be added to sanitize and maintain bacteria-free environment surrounding items stored inside the Module. All these features, allow the Apparatus (Module) described in the invention—to achieve superior objectives in terms of: safety, security and efficiency in providing affordable and profitable service vs. existing methods.

Components are labeled as follows:

5—Automatic Vending Module

Module capable of receiving and executing commands in real-time from local or remote Controllers, and depending on commands—either reject a customer from being served, or allow a customer to obtain items available for vending, and monitor items vended or considered by a customer. The Module contains Recognition Devices to accept and process SHOPPING CARD. The Module Controller will report information about inserted and detected CARD to central Controller, as requested. The Module Controller will report to central Controller information about Transactions within the Module completed under specific CARD, as requested. Environment inside the Module could be controlled by local or remote Controller. Inventory of items inside the Module is monitored by local or remote Controller via barcode reading sensors, providing information of items being placed into the Module and items taken out. Each Module could provide a variety of items. Module Controller local or remote could execute directly control commands in real-time based on information obtained from the inserted CARD, which could include: advancing certain items within the Module for immediate vending or dispensing as soon as requested by a Customer represented by the inserted CARD. Example—ADVS system submitted by the inventor, and on file at the USPTO under application Ser. No. 11/320,420, which could be used for vending a variety of pre-packaged items, including: prescription drugs, pre-packaged food. Automatic Vending Module will have at least one Recognition Device for accepting SHOPPING CARD Cards. Automatic Vending Module will have Recognition Device for accepting SHOPPING CARD Cards specific to a chain of stores, one store, section within a store, or sections within a store.

Automatic Vending Module will have required automation devices, including barcode readers to identify: items being loaded into the Module; items dispensed during a Customer Transaction; items being returned back by a customer; items being returned to Provider.

Automatic Vending Module could have a scale, which will be used by Controller to monitor the weight of items being loaded into the Module, and items being removed or vended-out from the Module. The Automatic Vending Module could be designed to accept only Cards with Mechanical Identifications. Module could be designed for containing only packaged Items identified by a label with a barcode. Modules could be designed to sustain environment inside, which is friendly to the items stored inside. In addition, anti-bacterial natural environmentally friendly ingredients could be added to sanitize and maintain bacteria-free environment surrounding items stored inside the Module. All these features, allow the Apparatus (Module) described in the invention—to achieve superior objectives in terms of: safety, security and efficiency in providing affordable and profitable service vs. existing methods.

6—User Interface, which could be a touch screen monitor with controller. The User Interface could be designed to display important information: content or items available from the Module; instructions on how to use the Module to receive Items; environmental parameters, including: temperature, humidity—inside the Module;

7—Card Recognition Device, which is a combination of a Controller (local or remote) and sensors designed to:
 a) Allow physically insertion-removal of one SHOPPING CARD.
 b) Reading all or selected identification features of the SHOPPING CARD, or reading specific identification features of the SHOPPING CARD, as instructed by Controller
 c) Reporting identifications obtained from an inserted SHOPPING CARD to local and/or remote Controllers via wired or wireless network Recognition Device are designed to operate with a series of Cards, will have their respective sensors located outside the slot of the Recognition Device the Cards will be inserted in, and the Sensors position will be referenced in {X.Y} coordinates will be referenced to respective Registration and/or Alignment features embedded into the Recognition Device and the series of Cards. Recognition Devices could have Sensors to detect all identification features of the Card inserted, or selected identification features of the Card inserted. Special alignment grooves or channels embedded inside the slot of the Recognition Device for ease of insertion and alignment of the Card to be inserted into the slot of a Card Recognition Device. The size, shape, orientation, number and materials of the alignment grooves or channels of the Recognition Device could be selected to provide reliable mating and engagement with respective channels or grooves of the Card. When a Card is inserted into a Recognition Device of a Module, Controller connected to the Recognition Device will obtain identification (alignment, mechanical, electrical, barcode) information of the Card inserted, and based on this information will control access to the Module. When a Card is inserted into a Recognition Device of a Module (5), Controller connected to the Recognition Device will obtain identification (alignment, mechanical, electrical, barcode) information of the Card inserted, and based on this information will: control access to Vending Module; monitor and record activities and Transactions taken place in respect to Items within the Vending Module (5); record respective information into the Data Base; retrieve respective information from the Data Base. Recognition Devices are connected to Controller local or remote, and connection could be either wired or wireless. Recognition Devices will be monitored and controlled by respective Controller(s), providing Controller(s) with user identification information, as requested, or as needed. Controller will select in real-time the identification features a Recognition Device will be required to detect when a Card is inserted into it, and then report selected identification features to Controller, as requested or needed.

8—RFID reader, which is designed to detect the RFID tag embedded into the Card

9—Vended Item pick-up bin

31—Status Light of Module (5). The Status Light is controlled by the local or remote Controller. The status of the Module, such as: Available (not in-use); Busy (in-use); In-service—could be indicated by the Status Light by changing its color: Green (available); Yellow (in-use); Red (in-service). The Status Light could also incorporate an illuminated characters, representing: Module ID. The Status Light could be designed based on "Low-cost Illumination Device" filed by inventor with the USPTO under application Ser. No. 12/221,337.

Figure 18:
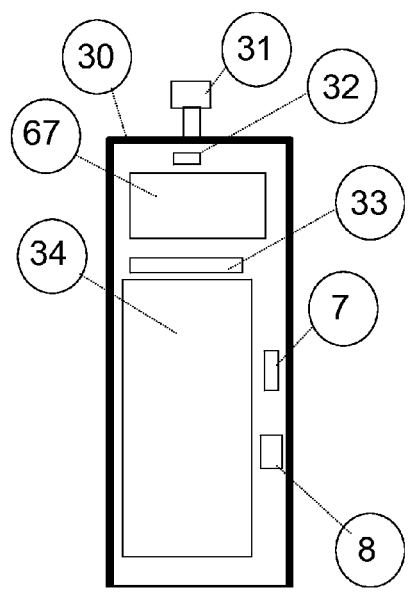

FIG. 18—Illustrates Automated Product Module (30), which includes: RFID reader (8), Card Recognition Device (7). The Module could be designed to accept only Cards with Mechanical Identifications. Module could be designed for containing only packaged Items identified by a label with a barcode. Modules could be designed to sustain environment inside, which is friendly to the items stored inside. In addition, anti-bacterial natural environmentally friendly ingredients could be added to sanitize and maintain bacteria-free environment surrounding items stored inside the Module. All these features, allow the Apparatus (Module) described in the invention—to achieve superior objectives in terms of: safety, security and efficiency in providing affordable and profitable service vs. existing methods. Optional User Interface (not shown for simplicity), such as the component (6) illustrated on FIG. 9, could be added, which could be a touch screen monitor with controller. The User Interface could be designed to display important information: content or items available from the Module; instructions on how to use the Module to receive Items; environmental parameters, including: temperature, humidity—inside the Module;

Components are labeled as follows:

7—Card Recognition Device, which is a combination of a Controller (local or remote) and sensors designed to:
 a) Allow physically insertion-removal of one SHOPPING CARD.
 b) Reading all or selected identification features of the SHOPPING CARD, or reading specific identification features of the SHOPPING CARD, as instructed by Controller
 c) Reporting identifications obtained from an inserted SHOPPING CARD to local and/or remote Controllers via wired or wireless network Recognition Device designed to operate with a series of Cards, will have their respective sensors located outside the slot of the Recognition Device the Cards will be inserted in, and the Sensors position will be referenced in {X.Y} coordinates will be referenced to respective Registration and/or Alignment features embedded into the Recognition Device and the series of Cards. Recognition Devices could have Sensors to detect all identification features of the Card inserted, or selected identification features of the Card inserted.

Special alignment grooves or channels embedded inside the slot of the Recognition Device for ease of insertion and alignment of the Card to be inserted into the slot of a Card Recognition Device. The size, shape, orientation, number and materials of the alignment grooves or channels of the Recognition Device could be selected to provide reliable mating and engagement with respective channels or grooves of the Card. When a Card is inserted into a Recognition Device of a Module, Controller connected to the Recognition Device will obtain identification (alignment, mechanical, electrical, barcode) information of the Card inserted, and based on this information will control access to the Module. When a Card is inserted into a Recognition Device of a Module (5), Controller connected to the Recognition Device will obtain identification (alignment, mechanical, electrical, barcode) information of the Card inserted, and based on this information will: control access to Vending Module; monitor and record activities and Transactions taken place in respect to Items within the Vending Module (5); record respective information into the Data Base; retrieve respective information from the Data Base. Recognition Devices are connected to Controller local or remote, and connection could be either wired or wireless. Recognition Devices will be monitored and controlled by respective Controller(s), providing Controller(s) with identification information to Controller, as requested, or as needed. Controller will select in real-time the identification features a Recognition Devices will be required to sensor when a Card is inserted into it, and then report selected identification features to Controller, as requested or needed

30—Automated Product Module

Module, which contains pre-packaged products with a product label that includes: barcode and/or RFID. The access to the products inside Module is controlled via automatic doors. The Module contains Recognition Devices to accept and process SHOPPING CARD. The Module Controller will report information about inserted and detected CARD to central Controller, as requested. The Module Controller is capable of receiving and executing commands in real-time in real-time from local or remote Controllers, and depending on commands—either reject a customer from being served, or allow a customer to obtain items stored inside. Example—if customer is accepted, local or remote Controller could open the access door automatically or unlock the door and inform the customer that the door could be opened, to allow the customer to pick-up a merchandize. Automated Product Module will have required automation devices, including: barcode readers to identify items being taken out during a Customer Transaction, and items being returned back by a customer. The Module Controller will report to central Controller information about Transactions within the Module completed under specific Card, as requested. Environment inside the Module could be controlled by local or remote Controller. Inventory of items inside the Module is monitored by local or remote Controller via barcode reading sensors, providing information of items being placed into the Module and items taken out. Each Module could provide a variety of items. Module Controller local or remote could execute directly control commands in real-time based on information obtained from the inserted Card, which could include: advancing certain items within the Module for immediate access as soon as requested by a Customer represented by the inserted Card. Automated Product Module could have a scale, which will be used by Controller to monitor the weight of items being loaded into the Module, and items being removed from the Module. Automated Product Module could have bins sitting over designated scales, which will be used by Controller to monitor the weight of items being: loaded into each bin; items being removed from the bin; items being returned back to the bin. The Automated Product Module could be designed to accept only Cards with Mechanical Identifications. Module could be designed for containing only packaged Items identified by a label with a barcode. Modules could be designed to sustain environment inside, which is friendly to the items stored inside. In addition, antibacterial natural environmentally friendly ingredients could be added to sanitize and maintain bacteria-free environment surrounding items stored inside the Module. All these features, allow the Apparatus (Module) described in the invention—to achieve superior objectives in terms of: safety, security and efficiency in providing affordable and profitable service vs. existing methods.

8—RFID reader, which is designed to detect RFID tag embedded into the Card

9—Vended Item pick-up bin

31—Status Light of Module (5). The Status Light is controlled by the local or remote Controller. The status of the Module, such as: Available (not in-use); Busy (in-use); In-service—could be indicated by the Status Light by changing its color: Green (available); Yellow (in-use); Red (in-service). The Status Light could also incorporate an illuminated characters, representing: Module ID. The Status Light could be designed based on "Low-cost Illumination Device" filed by inventor with the USPTO under application Ser. No. 12/221,337.

32—Optional Security Camera

33—Barcode Scanning Device. The Barcode Scanning device could be designed for manual scanning, i.e. item's barcode must be presented at a certain orientation in respect to the Scanning device. The Barcode Scanning device could be also designed for automatic scanning, i.e. item's barcode will be automatically scanned and identified, when an item with its barcode label is passed through the perimeter of the access door (34). The Barcode Scanning device is controlled by local or remote Controller, and respective information obtained by Controller from the Barcode Scanning device will be used by Controller to identify an item the barcode label is attached to.

34—Access Door. The access to the Access Door is controlled by local or remote Controller. Example: a mechanical latch operated by a solenoid could be activated by Controller to un-lock the Access Door and allow a customer to open it. If no power is applied to the solenoid—the Access Door is locked, and could only be accessed by the service personnel. The Access Door could be made out of "clear-view-through" materials, to allow customers to view items inside the Module. The Access Door will have required insulation to maintain environment inside the Module.

Figure 19:
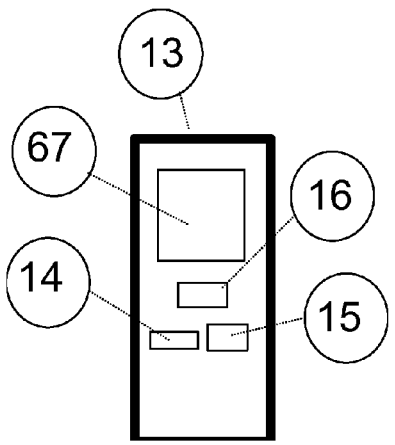

FIG. 19—illustrates Payment Module (13). Payment Module (13), such as ATM or SCO, with addition of Recognition Devices to accept and recognize SHOPPING CARD Cards. The Module Controller will report information about inserted and detected to central Controller, as requested. The Module could obtain records from the central Controller related to all Transactions, which were previously recorded under SHOPPING CARD. Module Controller local or remote could execute directly control commands in real-time based on information obtained from the inserted Card, which could include: greeting and directing the Customer (voice or visual display), pulling records from the Database of Transactions completed by the Customer represented by the inserted Card. When a SHOPPING CARD is inserted into Automated Payment Station, and based on the Card identification data, information of all Transactions is retrieved by Controller from the Data Base—the customer will be presented with a comprehensive list or invoice of items the customer intends to purchase. The customer could: pay for all items; return selected items, and pay for the remaining items; return all items. After payment is completed, Controller will execute Transactions closing procedure, which will include: print out the receipt; label all Transactions in the Data Base under the Card as being processed; link respective Transactions to a customer ID, if authorized by the customer, which could be used for statistical analysis; de-activate inserted SHOPPING CARD and update its status in the Data Base; instruct the customer to remove the Card from the Recognition Device, and return de-activated Card to a provided location.

Components are labeled:

14—Card Recognition Device

Recognition Device designed to operate with a series of Cards, will have their respective sensors located outside the slot of the Recognition Device the Cards will be inserted in, and the Sensors position will be referenced in {X.Y} coordinates will be referenced to respective Registration and/or Alignment features embedded into the Recognition Device and the series of Cards. Recognition Devices could have Sensors to detect all identification features of the Card inserted, or selected identification features of the Card inserted.

15—RFID Reader Device, which is designed to detect the RFID tag embedded into the Card 16—Receipt Printer Other devices, including: Touch-screen User Interface, Status Light—could be added, as needed.

Figure 20:
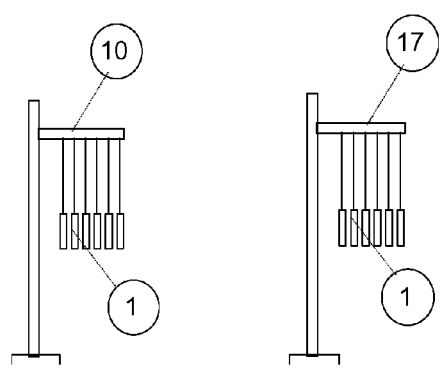

FIG. 20—illustrates racks (17) and (18), which are used for holding or hanging SHOPPING CARD Cards (1). Rack (17) could be used for holding or hanging Activated SHOPPING CARD Cards, available for arriving Customers at an entry to a designated location, while Rack (18) could be used for holding or hanging De-activated SHOPPING CARD Cards.

Figure 21:
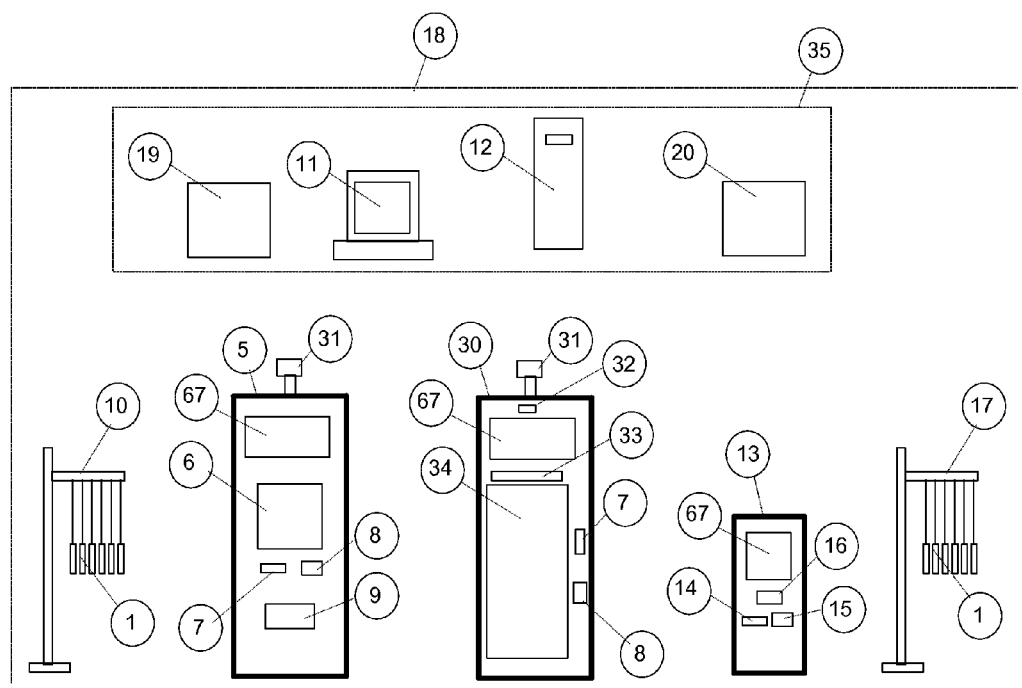

FIG. 21—Illustrates example of a location with major principal components, which will utilize Apparatus described by the invention, including SHOPPING CARD Cards to control Transactions. Location could be a store or a section within a store. For most efficiency, access and disposition of items within the location is controlled by SHOPPING CARD Cards. For simplicity—the selected locations for example below are labeled as: "store" and "section" within the "store". Not all features described below are illustrated, for simplicity.

Example of Operation:

1) Prior to opening a shift at a "store" location, all SHOPPING CARD Cards are de-activated, as needed, by Controller local or remote. De-activation includes resetting in the Database all previous Transactions recorded in the Database for any of SHOPPING CARD assigned to the "store". De-activated Cards (1) could be presented to a customer at the Card holding rack (10)

2) New customers, upon entering the "store" and/or "section", are introduced to the rules by an information kiosk, or other means selected by provider, which could be specific for the "store" and/or "section". "Section" could, for example, utilize more features available on SHOPPING CARD Cards for added security and/or convenience.

3) Respective SHOPPING CARD Cards will be made available at the point of entry into the shopping "store" and/or "section". Identification features of the SHOPPING CARD Cards are enabled, as required, for any given "section" within a "store". Example: purchasing expensive items will require to enable all identification or security features, while purchasing less expensive items, such as vegetables, could require just few identification or security features.

4) Customer before entering the controlled "store" or "section" of a store will require to pick-up an active SHOPPING CARD (1) located at a rack (10) near entry. Supply of activated SHOPPING CARD is maintained by store personnel. Each SHOPPING CARD is a unique combination of its identification features or properties, no duplicates within a location allowed. Once on-hand, a Customer is "treated" by the Controller as an entity represented by SHOPPING CARD properties.

NOTE: If a customer decides to leave the location without a purchase, the SHOPPING CARD will need to be returned via available ATM/SCO, or at a designated SHOPPING CARD Control Module. In either case the respective SHOPPING CARD will be de-activated 5) To purchase an item, a Customer with SHOPPING CARD will approach a point-of-product location, such as: Automatic Vending Modules (5), Automated Product Modules (30)—where the desired items are located. The status of each product Module is displayed by its Status Light (31). Customer could view the content of items inside a Module via "see-through" Access Door (34), if provided, and via User Interface touch-screen monitor (6), or standard monitor.

6) When Module is available, as indicated by the Status Light (31) or User Interface (6), the Customer will insert the SHOPPING CARD (1) into the slot of a Recognition Device (7). The sensors within Recognition Device (7) via local or remote Controller (11) will guide the Customer and inform if the SHOPPING CARD inserted is approved for purchase at the Module. Controller (11) could indicate the status via local status LED's in conjunction with audio messages of the User Interface (6)

7) The local or remote Controller (11) based on information obtained from the SHOPPING CARD, will execute required controls allowing the Customer to obtain items from the Module. Depending on Module, items being removed from the Module and/or returned back to the Module—could be automatically tracked by respective sensors and controllers. Tracking could be based on barcode. For security purposes, tracking could include video recordings.

8) As soon as the first item is picked out from the Module, the local or remote Controller (11) will activate the SHOPPING CARD, if not activated already, and open a new, if the one active does not exist, a record of Transactions in the Database (12). The item that was pulled out of Module will be recorded as a potential purchase into Transaction records.

NOTE: Controller (11) will in real-time maintain status of the SHOPPING CARD (1), and will control its functions within a store. The Controller (11) will de-activate the Card (1) when it is inserted by customer into a Payment Module (13) and all Transactions are paid for, or when the Card (1) is inserted into de-activation Module (no shown for simplicity) by provider.

9) The Transactions Record in the Data Base (12) will include: SHOPPING CARD properties, Date, Time, and Transactions under given SHOPPING CARD. Example of Transactions record in the Data Base:

Transactions:
0001 Item barcode, qty, cost per unit, total cost
0002 Item barcode, qty, cost per unit, total cost
........
Transaction total cost:

NOTE:
additional information, including: date, time, Module ID - could be added by Controller, as needed.

10) When done shopping, a customer will proceed with potential purchases to the Payment Module (13) or station, including ATM, SCO. If just few items were purchased, and no weighing is required, and no returned items—then ATM (not attended) could be used, otherwise—attended payment station, such as Cashier SCO will need to be used. At either ATM or SCO the customer will be required to identify himself by inserting SHOPPING CARD into a slot of the Recognition Module (7) where SHOPPING CARD properties will be read by local and/or remote Controller (11) via Recognition Module (7). Once the SHOPPING CARD is accepted by the Controller (11) the respective Database Transaction records are analyzed by Controller

(11) and customer will be presented of the list of items purchased and total amount due to pay for them. Payment options: cash, debit/credit Card, electronic check, etc. Customer could refuse payment and leave the store without items, or make a payment per instructions. At attended payment station, or auto station designed to handle returns, customer could return and get credit for specific items, and pay for the remaining items. Upon payment—the customer will be presented with a receipt, and instructed to return de-activated Card.

11) The customer will be able to exit the store with purchased items. Main Controller (11) via RFID Monitoring Device (19) will monitor all activities via SHOPPING CARD Cards and will not allow a customer to leave a store with a SHOPPING CARD if it is equipped with embedded RFID regardless of the Card state, active or de-activated. The Controller (11) based on information obtained from RFID Monitoring Device (19), could also prevent entry of the Card with specific RFID tags into a designated location.

NOTE: The Cards without RFID identification feature could be made large enough and have color-code, preventing customers from taking them out.

12) De-activated SHOPPING CARD could be re-programmed by respective SHOPPING CARD Machine Controller (20) and placed back into circulation, as needed. At any time, a "store" via main Controller (11) could limit amount of activated SHOPPING CARD Cards (1) within a "store" or "section", or specific location. A store could select an algorithm for Controllers (11) and Recognition Modules (7) to provide: section-specific and/or Module-specific monitoring and controls of the Card identification features, Card Transactions—with an objective to increase security, improve service, etc. at selected sections within a store In general, the Data Base will be used by Controller in real-time or as needed to store all parameters related to:
a) Physical components present at a location (store), including: Modules installed (ID, specifications, location, status); CARD series implemented (identification features embedded/enabled, specifications, assigned sections within a store, status)
b) CARD series implemented for the location (store), including: alignment and identification features embedded into the Card; each feature {X,Y} coordinate
c) Each unique Card within a series of Cards, including: status of the Card; status of each identification feature;
d) Recognition Devices implemented for the location (store), including: location (Module, Access Door); Sensors installed (specification); Card alignment features implemented in the slot; Controller interface features
e) Transaction history, which could be sorted by one or number of parameters, including: item ID, Card ID, Module ID, User ID, date, time FIG. 22 through FIG. 23—illustrate Apparatus controller configurations in support of variety of devices.

Figure 22:
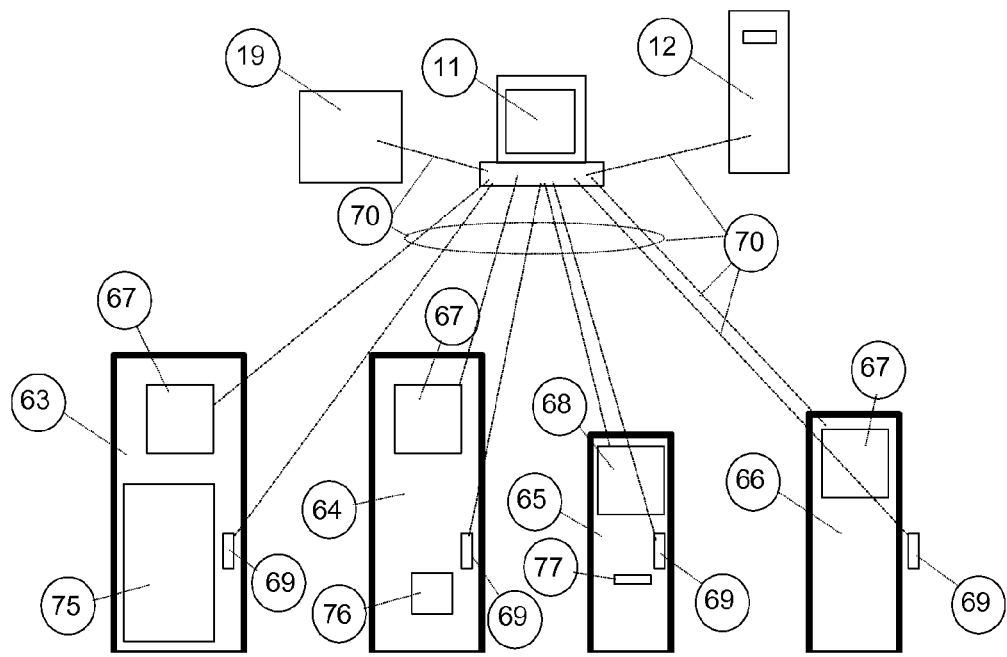

FIG. 22—Illustrates an Apparatus described by the invention, which is based on a single central Controller (11), which via any or combination of wired or wireless network (70) will be connected to all stand-alone devices, including: Data Base (12); RFID monitor (19), and devices installed inside Modules (63, 64, 65, 66). Devices installed into Modules will include: user interfaces (67, 68); status lights (not shown for simplicity); Card Recognition Devices (69); Printers (77). Controller (11) via any or combination of wired or wireless network (70), will interface directly to components inside devices, including: sensors, solenoids, LED's, lights, actuators (motors). The central Controller (11) will directly, without operator assistance, based on information obtained from the Identification Card via Card Recognition Devices (69) and based on set criteria, will execute in real-time control of devices to authorize access to items inside the module or access to a location where items are present. The central Controller via Card Recognition Devices (69) and sensors (barcode) installed into Modules, will monitor, analyze and record into the Data Base (12) transactions of items executed under unique identification features of the Card being used to gain access to the items. The central Controller without operator assistance, will monitor, analyze and record transactions executed under unique identification features of a Card being used, and provide the records to Module (65) to complete the transactions, including generating an invoice of items being purchased and receipt of a payment received for items being purchased. The central Controller (11) directly or indirectly via operator will maintain in real-time required inventory of items within a Module or a location. The central Controller (11) without operator will inform operator of items available within a Module or a location, and will provide instructions and direct an operator on how to obtain the items. The central Controller (11), based on information obtained from respective environmental sensors inside Modules (53, 64), will execute controls to maintain environment within respective Modules per set criteria or specifications. The central Controller (11), based on status of each Module, will control respective status LED's and lights mounted to the Module. The central Controller (11) could be connected to other controllers outside the location via one or combination of wired or wireless networks.

Remaining components are labeled as follows:
63—Automated Vending Module
64—Automatic Vending Module
65—Payment Module
66—Access Door to a location with other Modules or items
75—Access Door to items inside Automated Product Module (63)
76—Item pick-up bin inside Automatic Vending Module (64)

Figure 23:
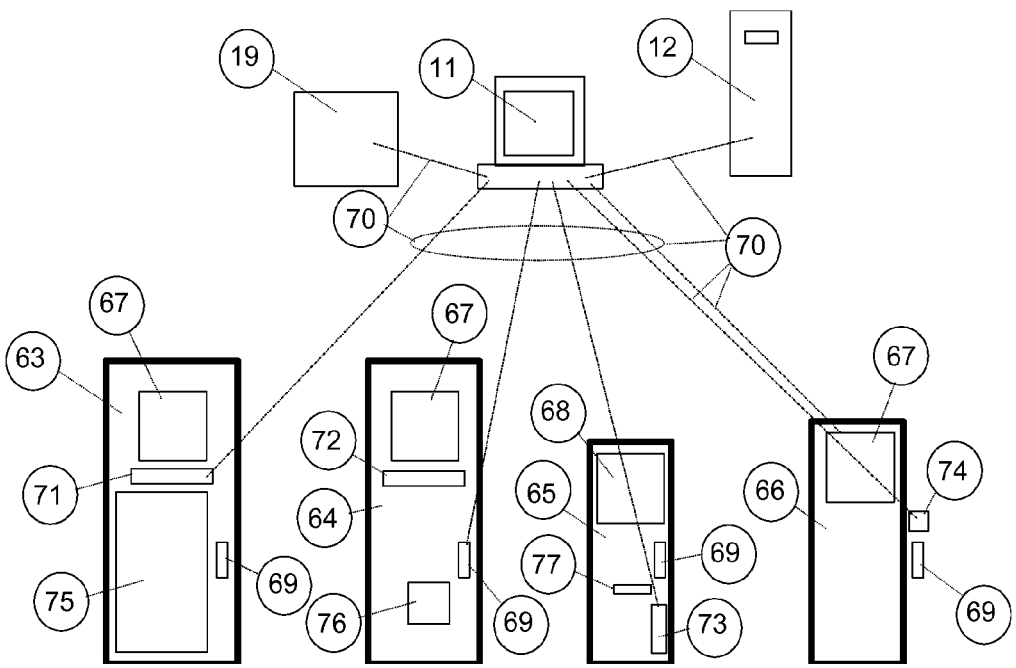

FIG. 23—Illustrates an Apparatus described by the invention, which is based on multiple Controllers (11, 71, 72, 73, 74), which via any or combination of wired or wireless network (70) will be connected to respective stand-alone devices, including: Data Base (12); RFID monitor (19), and devices installed inside Modules (63, 64, 65, 66). Devices installed into Modules will include: user interfaces (67, 68); status lights (not shown for simplicity); Card Recognition Devices (69); Printers (77). Controllers (11, 71, 72, 73, 74), via any or combination of wired or wireless network (70), will interface directly to respective components inside devices, including: sensors, solenoids, LED's, lights, actuators (motors). The central Controller (11) will directly, without operator assistance, based on information obtained from other Controllers (71, 72, 73, 74) connected to the respective Card Recognition Devices (69) and based on set criteria, will instruct respective Controllers (71, 72, 73, 74) to execute in real-time control of respective devices to authorize access to items inside the module or access to a location where items are present. The central Controller (11) via respective Controllers (71, 72, 73, 74) connected to respective Card Recognition Devices (69) and sensors (barcode) installed into Modules, will monitor, analyze and record into the Data Base (12) transactions of items executed under unique identification features of the Card being used to gain access to the items. The central Controller (11) without operator assistance, via respective Controllers (71, 72, 73, 74) will monitor, analyze and record transactions in the Data Base (12) executed under unique identification features of a Card being used, and provide the records to respective Controller (73) of the Payment Module (65) to complete the transactions, including generating an invoice of items being purchased and receipt of a payment received for items being purchased. The central Controller (11) via Controllers (71, 72) directly or indirectly via operator will maintain in real-time required inventory of items within a Module or a location. The central Controller (11) via respective Controllers (71, 72) will inform operator via respective Controllers (71, 72) of items available within a Module or a location, and will provide instructions and direct an operator on how to obtain the items. The central Controller (11), based on information obtained via respective Controllers (71, 72) from respective environmental sensors inside Modules (53, 64), will execute controls via respective Controllers (71, 72) to maintain environment within respective Modules per set criteria or specifications. The central Controller (11), based on status of each Module, will control respective status LED's and lights mounted to the Module. The central Controller (11) could be connected to other controllers outside the location via one or combination of wired or wireless networks. The control functions between all Controllers (11, 71, 72, 73, 74) could be re-allocated or re-assigned within the Apparatus, with an objective to achieve most reliable, efficient and safe operation.

Remaining components are labeled as follows:
63—Automated Vending Module
64—Automatic Vending Module
65—Payment Module
66—Access Door to a location with other Modules or items
75—Access Door to items inside Automated Product Module (63)
76—Item pick-up bin inside Automatic Vending Module (64)

FIG. 24 through FIG. 28—illustrate mechanical features of a Card which could be used for: alignment, identification and locking of the Card.

Figure 24:
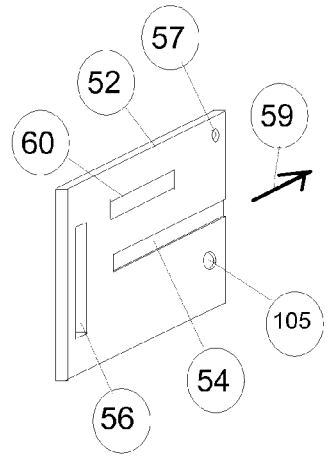

FIG. 24—Illustrates a SHOPPING CARD (52), configured with: barcode label (60); groove or slot which could be used for alignment with a Card Reading device; slot which could be used for handling the Card; opening (57), which could be used for Card recognition and alignment; opening (105), which is used for locking the Card. When a Card is inserted into a device, such as Card Recognition device, Controller could lock the Card by activating an actuator, such as solenoid, which will extend its plunger through the opening (105) of the Card (52), and prevent the Card from being removed. Controller could use this locking feature of the Card as needed during number of processes, including: Card validation; item transactions in progress executing under identification features of the Card. Controller could unlock the Card by de-activating the actuator, such as solenoid, which will retract its plunger through the opening (105) of the Card (52), and release the Card, which then could be removed from the slot of the Card Recognition Device. Direction of insertion of the Card (52) into a device, such as Card Reading device, is labeled by (59).

Figure 25:
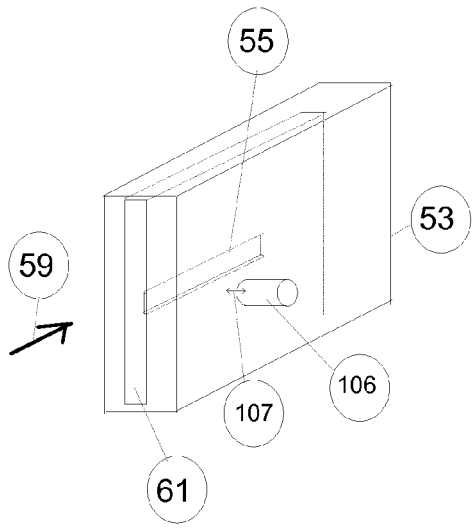

FIG. 25—Illustrates a Card Recognition Device (53), which is designed to accept Card (52) and a series of Cards designed based on Card (52). The slot (61) of the Card Recognition Device (53) is designed to have a channel (55), which will point the direction (59) for a Card to be inserted into the slot (61), and the channel (55) will mate with respective slot embedded into the Card. The size, shape, orientation, number and materials of the alignment channels or grooves designed into the slot (61) could be selected to provide reliable mating and engagement with respective grooves and channels embedded into Card. The solenoid (106) is configured to align with the respective latching hole of the Card to be inserted, and when activated by Controller will extend its plunger along the direction (107) through the opening in the Card to prevent the Card from being removed. When de-activated by Controller, solenoid (106) will re-tract its plunger to release the Card.

Figure 26:
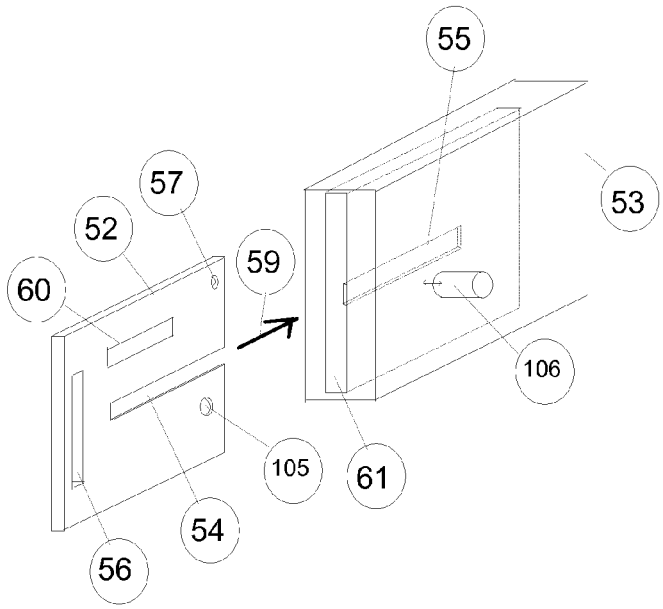

FIG. 26—Illustrates a SHOPPING CARD (52), illustrated on FIG. 24, in-process of being inserted in direction (59) into a slot (61) of the Card Recognition Device (53) illustrated on FIG. 25. Remaining components are labeled as on FIG. 24 and FIG. 25.

Figure 27:
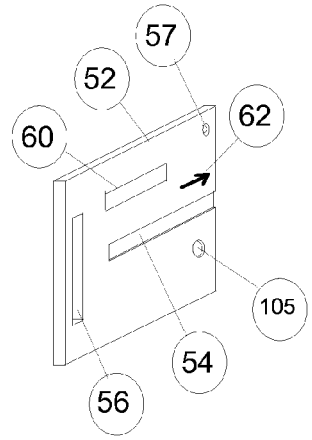

FIG. 27—Illustrates a SHOPPING CARD (52), illustrated on FIG. 24, with an addition of an embedded arrow (62) pointing in the direction of insertion of the Card into a Card Recognition Device. Remaining components are labeled as on FIG. 24.

Figure 28:
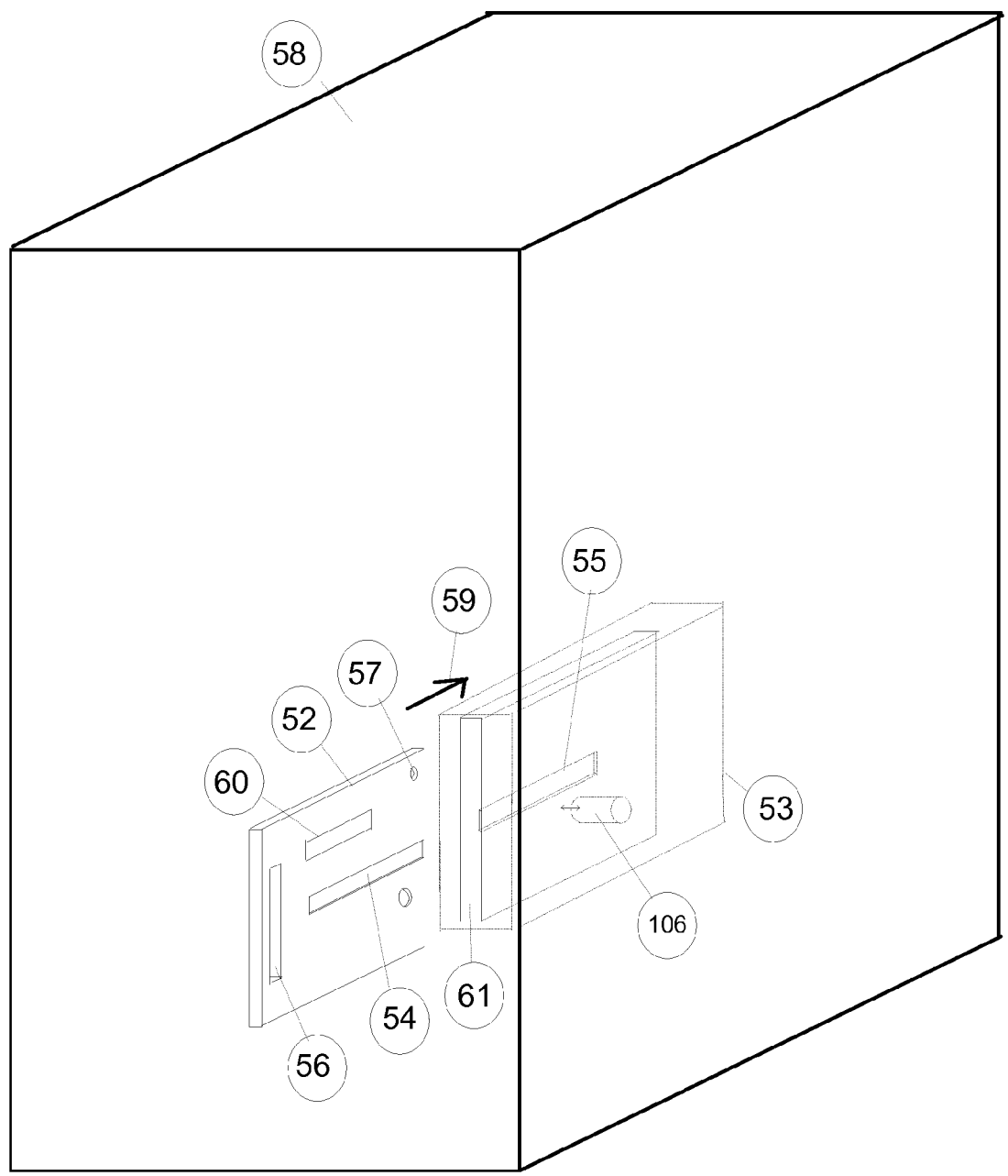

FIG. 28—Illustrates a SHOPPING CARD (52), illustrated on FIG. 24, in-process of being inserted in direction (59) into a slot (61) of the Card Recognition Device (53) illustrated on FIG. 25, which is installed into a Module (58). The Module (58) could be: Automatic Vending Module; Automated Product Module; Payment Module; Card Control Module, or any other Module access to which is controlled by a Card Recognition Device installed in the Module. Remaining components are labeled as on FIG. 24 and FIG. 25.

Figure 29:
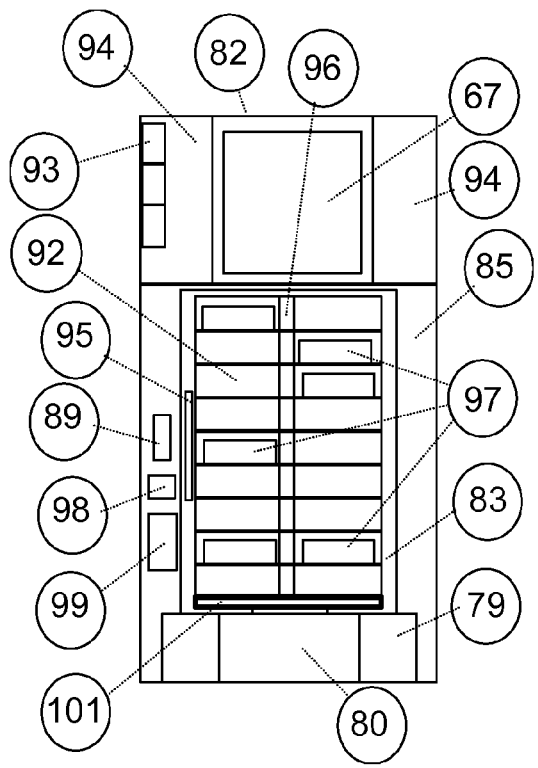
Figure 30:
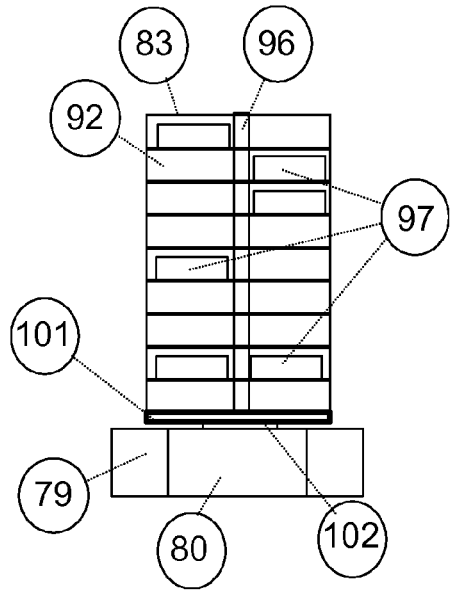
Figure 31:
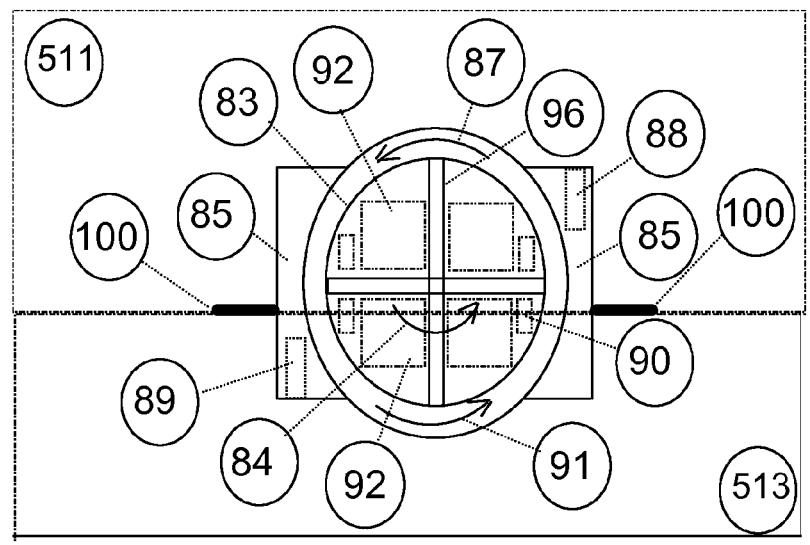

FIG. 29 through FIG. 31—illustrate examples of a Product Modules, which could be used for storing items available for purchase by customers using a Shopping Card.

FIG. 29—Illustrates customer view of a Product Module (82), as part of the Apparatus, configured for simultaneous access by an authorized customer from the customer side, and provider from the sides not accessible by the customer. For simplicity, the enclosure of the Product Module (82) consisting of walls, doors—for simplicity is illustrated as transparent, allowing viewing of selected components for reference. The illustrated Product Module features include: rotational door for allowing access to items by authorized customer; multi-section rotational item storage component (83); single scale device (80) for measuring combined weight of all items stored inside the Module (82); user and customer interfaces, including: Card Recognition device for customer. Items (97) could be placed on top of each other. Items (97), such as vegetables, could be sealed packaged into a bag. Each bag could have a barcode label attached or embedded, containing information in respect to item the label is attached to. Based on barcode information attached to each item, Controller directly or indirectly with assistance from operator, could obtain information about each item and store the information in the Data Base. The barcode information could include: description of item; Item weight; Item cost; Item issue date; Item use prior date; environmental code describing environment (temperature, humidity) best for storing the item. When an item (97) is removed from the storage or holding bin, the customer or operator will need to scan the item barcode to register its Transaction by Controller, which is connected to barcode reading device (89). In addition, Controller connected to the scale device (80) will be able to calculate the weight removed from the item storage bin, and register the Transaction. The item storage or item holding bins could be arranged on a rotating platform (83), and the rotating platform could be placed on the scale device (80). The entire weight of the rotating platform with item storage bins on top—will be monitored by Controller connected to the scale device (80). Removal of an item from any storage bin or addition of an item to the storage bin will be monitored by Controller connected to the scale device (80), and Controller will be able to calculate based on weight removed or added, which item was removed or added. This Transaction could be registered and recorded into the Data Base by Controller based on information obtained by Controller from barcode reading device (not shown for simplicity) and/or weight change reading provided to Controller by the scale device (80). In respect to operations of the scale device (80), for example, if a storage bin of rotating platform (83) is designed and used to hold specific items (97), and each item has about the same weight, labeled "W", then the total weight of the storage platform (83) reported by the scale device (80) would equal to: (W×N)+P, where: W—weight of each item; N—number of items inside (83); P—weight of the storage platform (83) without items. When an item is removed from the storage bin (83), the weight reported by the scale device (80) to Controller would decrease by W. When an item is added to the storage bin (83), the weight reported by the scale device (80) to Controller would increase by W. For simplicity Controller either local inside Module (82) or host Controller of the store section—is not shown.

Remaining components are labeled as follows:

79—section of Product Module (82) where number of devices are installed, including: scale device placed under the multi-section rotational item storage component (83), and connected to Controller for reporting weight of all items stored on (83); motor interface and controls for automated controls of the rotation of (83); other support devices. For simplicity, label (79) is used for description of the scale.

80—Scale device for measuring weight, including the weight of the items stored on multi-section rotational item storage component (83).

83—Multi-section rotational item storage component. The Product module (82) could be configured to allow customer to rotate (83) either manually by hand or automatically via user interface control panel (not shown) connected to Controller. The user interface panel could include: control buttons, diagnostic LED's. Controller based on safety criteria, when (83) is accessed by provider from the opposite sides, or as needed, will prevent (83) from being rotated.

84—Example of rotational direction of item storage component (83)

85—section of Product Module (82), which could be used for installation of support components, including: environmental controls; power controls; sensors; process controls.

89—Card reader customer side, which is configured to accept designated shopping Cards, and provide Controller with information which could be used by Controller to grant access to customer using the Card to items inside the Module (82). When Card is inserted, Controller will lock the Card inserted and via Card reader device will perform Card validation procedure. Once approved, Controller will inform the customer via available user interfaces (not shown for simplicity) that the Card is approved, and the Module is available for purchasing items stored inside.

92—section of the item or product shelf, where an item or items could be stored, and available for purchase by an authorized customer.

93—status lights, which are used by Controller to indicate to customers and providers status of the Product Module (82). Status lights could be based on patent pending Apparatus filed by the Applicant under the USPTO application Ser. No. 12/221,337, and via number of available indication features inform customers and providers of the status of (82), including: available; busy; in-service; maintenance required.

94—section of Product Module (82), which could be used for installation of components, including: controller; sensors; process controls; user interfaces.

95—handle for rotating the front access door from the customer side. For simplicity the door itself is not shown.

96—product shelf divider configured to separate item storage shelf (83) on 4 sections (as shown), two in-front and 2 in the back, which could be used for storing variety of items. Each section of the item storage shelf (83) could contain the same item or different items. In addition, when different items are stored—the respective section could have its own environmental controls, as required for items stored in the section.

97—items or products stored inside the Product Module (82)

98—Bar code reading device connected to Controller. Controller in real-time, depending on certain factors, including: configuration set by provider; previously recorded shopping history—could select the Bar code reading device to confirm transaction of each item being removed from the Module or placed into the Module (82). When selected, customer or provider, will be required to scan the barcode label of the item either being removed out of or placed in Product Module (82).

99—Printer, which could be configured by Controller to provide hard-copy statements or documents to customer, as needed

101—Base support panel for the multi-section rotational item storage component (83).

FIG. 30—Illustrates view of the multi-section rotational item storage component (83) described on FIG. 29. Figure elements are labeled as follows:

102—Drive shaft connecting the multi-section rotational item storage component (83) and the motor drive located inside section (79).

FIG. 31—Illustrates top view of a Product Module (82) described in part on FIG. 29. For simplicity, entrance to the Product Module (82) from both sides—customer and provider, is shown as implemented via rotational access doors: provider door (87) and customer rotational sliding door (91). Depending on configuration of the store, the provider section of the store (511) could be configured to provide centralized environmental control of items stored in adjacent Product Modules, same or similar to (82), and in this case each Product Module could be enclosed only from the Module side facing the store section (513), which is accessible by customer and provider. The sides of the Product Module (82) situated in the provider section (511) behind the section wall (100), could be left open for convenient access to Modules by the provider. The provider only side of the Product Module (82) could include a Barcode reading device (not shown), similar to the one described as (98) on FIG. 29, which will be used by Provider to register item transactions executed by Provider with the Controller, as required in order to maintain control and monitoring of items inventory inside the Module (82). As result, all transactions executed by the Provider and Customer are registered automatically in real-time by Controller reading the respective barcode from the item label, and detecting respective change of weight of remaining items inside the Module (82) via scale component installed in section (79) under the Multi-section rotational item storage component (83), as described on FIG. 29.

Figure elements are labeled as follows:

88—Card Recognition device, provider side, which could be installed for added security. When installed —would require provider to insert a Card, which would have the Card identification features verified by Controller, and based on store logistics—authorize provider to perform specific set of functions related to Product Module (82).

90—section of Product Module (82) or "reject bins" designated for rejected items. Each quadrant of the multi-section rotational item storage component (83) could have a dedicated "reject bin" (90), as shown. Reject bins (90) could be also monitored by the scale component located in the section (79), or by a dedicated scale. Product Module (82) could be configured for each transaction requiring Customer or Provider to scan a barcode label on the item removed from the Module (82), or placed into Module (82). Based on barcode information and appropriate weight reduction of items remaining in the Module obtained by Controller from the scale device (80) of Module (82) via LAN, the current transaction history of items will be updated. If any abnormality detected by Controller, including: improper weight change; wrong barcode label; item out of specifications (environment, shelf-life)—Controller in real-time without store operator assistance will inform and direct the Customer and/or Provider on required steps to correct the problem. Problems which could be resolved by Customer directly without operator assistance, include: item had a wrong barcode label, or item is out of specifications (environment, shelf-life)-requiring Customer to return item back to Module (82) and placing it in the designated "reject bin" (90). Reject bins Controller will confirm correction steps executed by the Customer by monitoring the combined weight of the "reject bin" inside the Module (82). An expected weight reduction when item is removed from Module (82) would be equal to the weight of the item, while expected weight increase when item is returned to the "Reject Bin" of module (82) would be equal to the weight of the item. The barcode label of the item will include important specification parameters of the item, including: weight min/max; due date (shelf-life limit); temperature min/max. Module (82) could be configured to have scale device (80) reporting weight for all items inside, including items inside "Reject bin", or have another dedicated scale device (not shown) to monitor and report the combined weight of "Reject bin" only.

Figure 32:
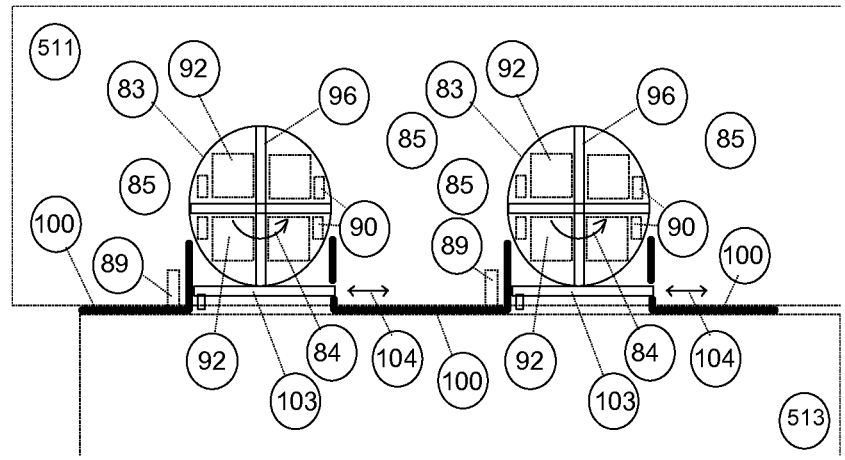
Figure 33:
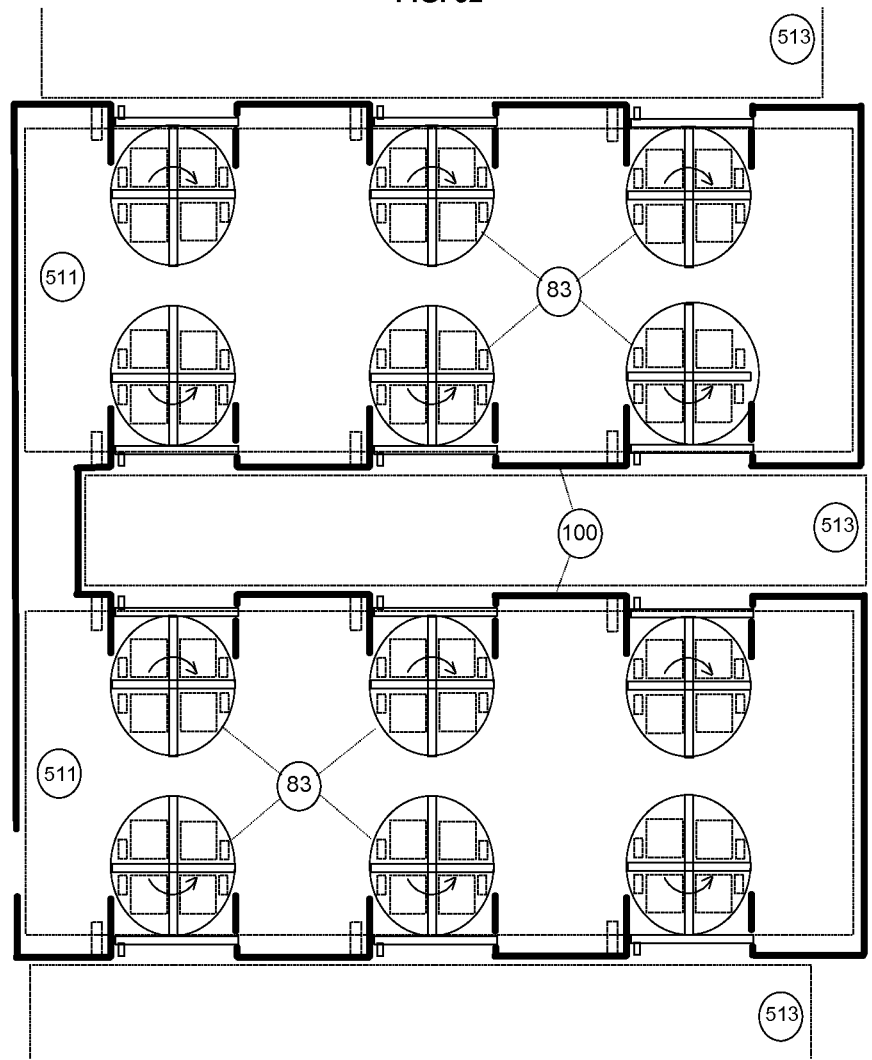
Figure 34:
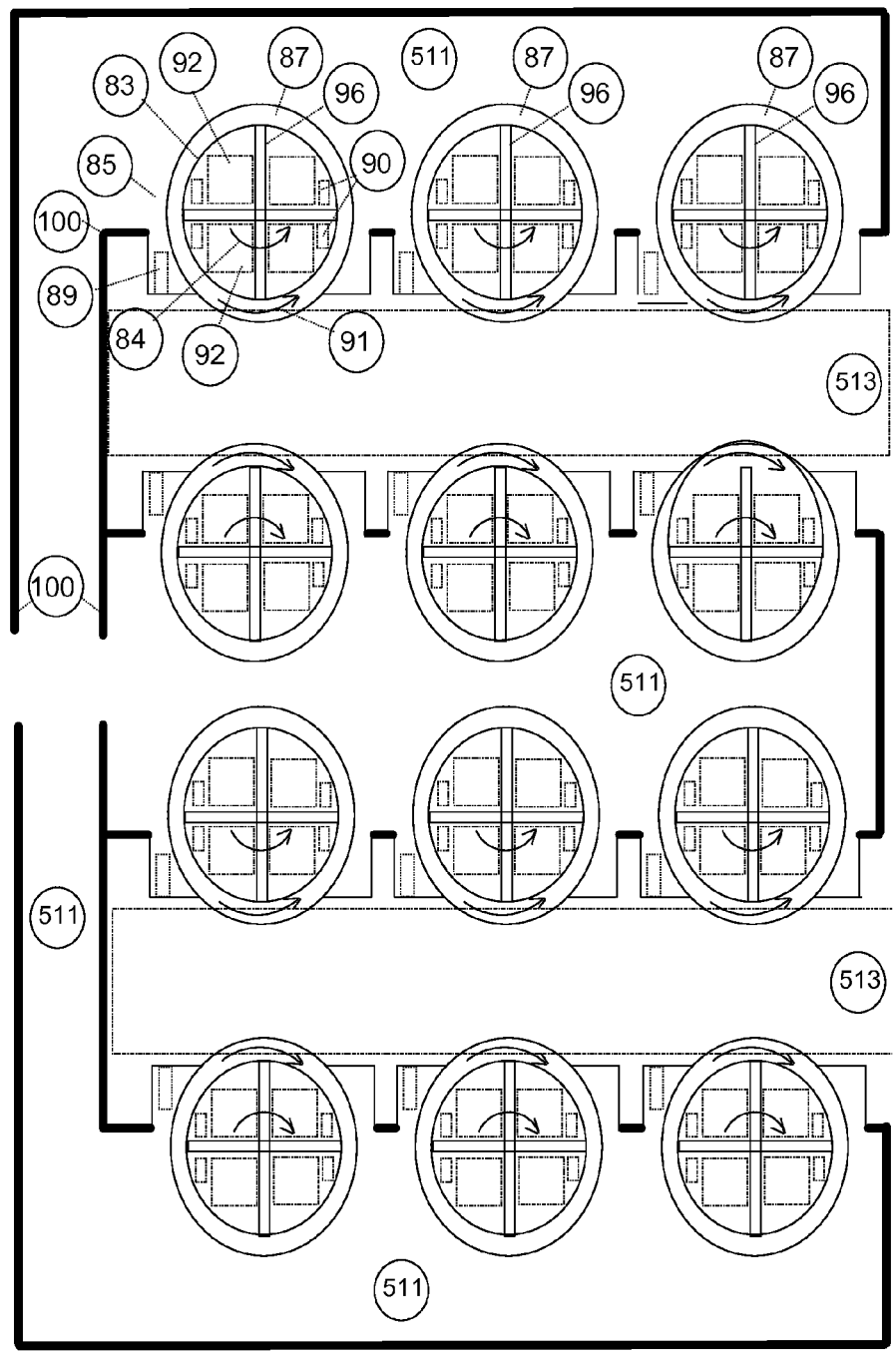

FIG. 32 through FIG. 34—illustrate examples of layouts of Product Modules within a store. Other devices of the Apparatus, including Host controllers—could be installed by Provider at a convenient location within the store. The layouts are illustrating Apparatus features in terms of supporting a variety of installations with an objective to achieve the most effective, efficient and ergonomically attractive utilization of resources, including available floor space.

FIG. 32—Illustrates example of a layout, which is configured using two side-by-side Product Modules (82) described on FIG. 31 with an exception that the rotational sliding access door (91) is replaced with a linear sliding access door (103), which could be opened-closed by an authorized Customer or Provider in direction indicated by (104). The wall (100) separating Customer section (513) from Provider section (511) is configured to house Card Recognition device (89), one for each Product Module. Remaining components are labeled same as on FIG. 31.

FIG. 33—Illustrates example of a layout of the Apparatus, which is configured to support quantity 12 of Product Modules (83) described on FIG. 32.

FIG. 34—Illustrates example of a layout of the Apparatus, which is configured to support quantity 12 of Product Modules (82) described on FIG. 31.

Figure 35:
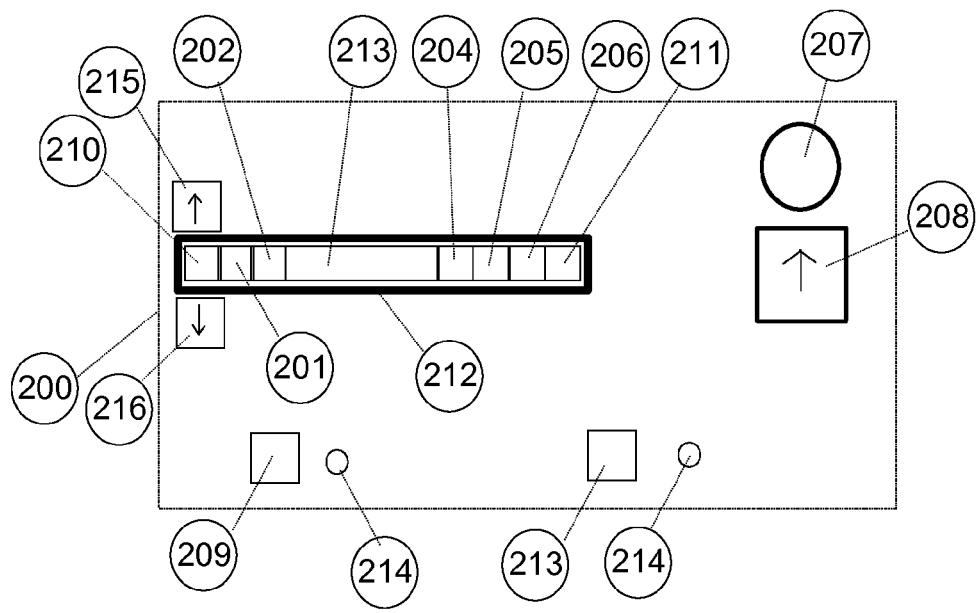
Figure 36:
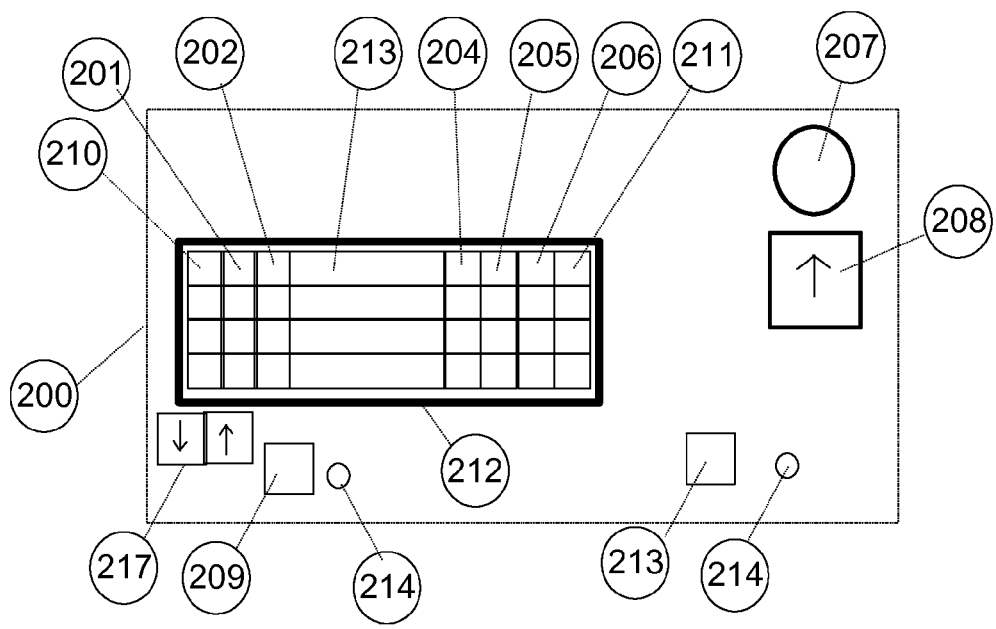

FIG. 35 through FIG. 36—illustrate examples of the Shopping Card configurations with embedded user interfaces, which will support real-time navigation of the Customer by Controller based on customer selected Shopping List. The illustrations are for the purpose of describing available features. The actual components, such as: display (212), user controls (213), diagnostics (214, 207, 208)—in terms of: type, size, location—could be configured with an objective to provide reliable user-friendly interfaces, including support of the navigation features, to enhance shopping experience by the customer, and improve efficiency of the store operations. Customer has an option to select AUTO mode, which enables Host Controller to automatically direct the customer within the store to complete selected Shopping List within set criteria, such as fastest time. Customer has also an option instead to select MANUAL mode, which enables Host Controller to assist the customer within the store with available options in procuring items selected by the Shopping List. In MANUAL mode Host Controller could be configured to provide Customer with real-time information related to items included in the Shopping List, including: status of items, status of modules, estimated time to complete selected Shopping List, estimated time to purchase an item listed on the Shopping List.

FIG. 35—Illustrates a configuration of a user interface (200) with a single line display (201), which could be embedded into one side of the Shopping Card. User interface (200) will include an embedded controller, which will interface with a Controller, including store Host controller via store wireless LAN. For illustration purposes, single line display (201) is divided on sections, which could be used as described below. The format and assignments of display sections could be changed, as needed. In addition, abbreviations will be used to minimize the number of characters. For simplicity, the user interface (200) is illustrated for a Card with a single Shopping List, which could be selected by the Customer at a point of Card validation using Card Validation module. Figure elements are labeled as follows:

210—Section of the single line display (212), which could be used for ID of the Shopping List selected by the Customer

201—Section of (212), which could be used for Item ID selected from the Shopping List

202—Section of (212), which could be used for indicating required quantity of Item

213—Section of (212), which could be used for description of the Item selected from the Shopping List

204—Section of (212), which could be used for ID of a store section where selected Item is available

205—Section of (212), which could be used for indicating status of the store section where selected Item is available. Status will include: A—available; B—busy; U—unavailable, such as in-service

206—

211—Section of (212), which could be used for indicating status of acquiring the Item selected from the Shopping List. Status will include: A—active, in process of being procured; C—completed.

215—Scroll button UP, allowing to select the next Item on the Shopping List

216—Scroll button DOWN, allowing to select the previous Item on the Shopping List

209—Control button, which is used for selecting the navigation mode of operation, which includes: AUTO or MANUAL. In AUTO mode the display (200) is updated by Controller in real-time, providing current information, including: navigation information; status of completed transactions.

214—Diagnostic LED's, which could be used to indicate selected action by the control button next to it 213—Control button, which is used for updating the Shopping List. When depressed, could instruct the Controller to download the next Shopping List.

207—Audio interface, such as speaker, which could be used to announce information, including: navigation; control instructions.

208—Visual display, which could be used to display an ARROW in the direction required to proceed per real-time navigation FIG. 36—Illustrates a configuration of a user interface (200) with a multi-line display (212), which could be embedded into one side of the Shopping Card. User interface (200) will include an embedded controller, which will interface with a Controller, including store Host controller via store wireless LAN. The user could control display (212) via up-down keys (217). The user interface (200) could be configured to include other control components, such as user keys, (not shown for simplicity) with an objective to provide the user with required functionality to improve shopping efficiency. Figure elements are labeled same as on FIG. 35.

Figure 37:
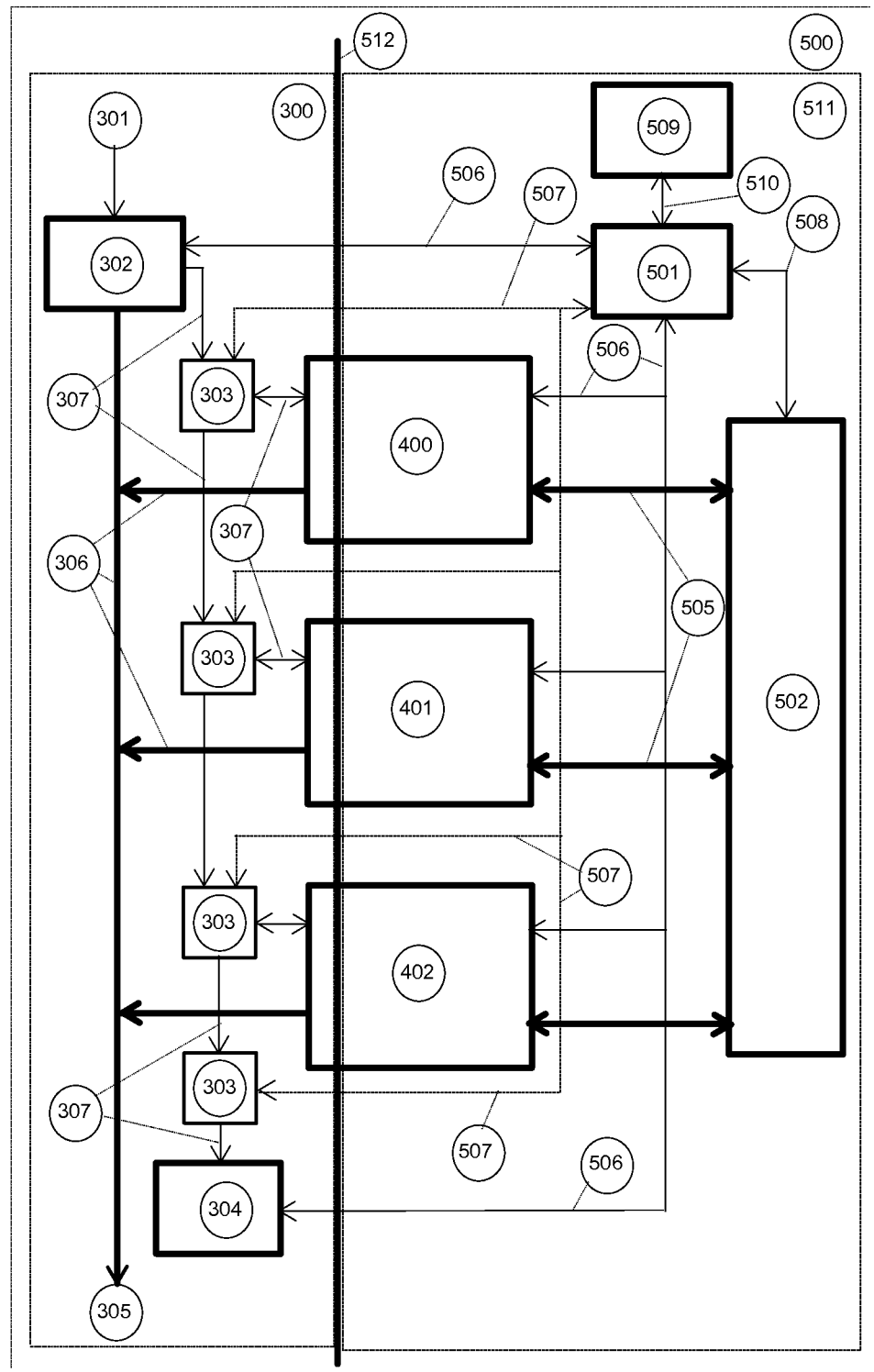

FIG. 37—Illustrates diagram, as an example, of a typical process inside a store using proposed Apparatus described in the application. When the Card is inserted into a Module and validated, the Controller will lock the Card preventing it form being removed while transactions are in progress. When transactions are completed, the Card could be retrieved only after the access door is closed and locked by Controller. When Customer links the Card directly to a payment account, all transactions completed are charged to the payment account, and when Customer completes shopping of the last item at a Module, Customer has an option to request payment of all completed transactions at that module, and receive receipt from a receipt printer at last Module, and proceed with exiting the store without a need to stop by a payment station. In this case the Card will be de-activated by Controller at the last Module used by Customer. Customer will still need to return the Card before leaving the store. Figure elements are labeled as follows:

300—Area of store section (500) allocated to be used by Customers and store operators.

301—Customer entering the store, and approaching the Control Section of the store responsible for issuing Shopping Cards (302). Prior to visiting the store, Customer could review on-line (internet): list of available items at the store; status of product modules handling specific items interested by the customer; expected time required to purchase an item; suggested time window for executing a specific shopping list within required time limits.

302—Card Control Section of the store responsible for issuing Shopping Cards (303). De-activated Shopping Cards are available, which may have the same identification features, which could be configured by store controller, as needed. Selected configuration of identification features could depend on: security requirements; existing traffic of customers within the store; items intended for purchase; previous history of a specific customer shopping at this store, or other stores. At the Control Section Customer can approach a Card Controller, connected to Store Controller (501) via store LAN (506), and upon successful sign-in procedure and authorization (criteria to include store review of previous shopping records, etc.), will be able to perform the following functions: review list if available items; status of modules where items are located; inventory of items; anticipated time to purchase an item, or a list of items per shopping list, under current shoppers traffic, and the shopping lists activated (in-progress) of being executed by other shoppers; create a shopping list; retrieve previously stored shopping list; insert and configure a Shopping Card (303), including: shopping list; direct link of the selected Shopping Card (303) to a Customer specified payment account (credit Card, bank account). In the example—Customer will create a new shopping list, and link the Shopping Card (303) to one of the payment accounts stored in the data base available to the Card Controller (501) from the store Host Controller and Data Base (509). The activated Shopping Card (303) will display the shopping list ID . . . as illustrated on FIG. XX. The Customer will select store real-time AUTO-navigation feature, and select method of communications (audio, visual, or both), and then will proceed with shopping following directions provided by the Card (303). Customer will be use available shopping cart (not shown for simplicity) to retain all purchased items.

303—Shopping Card, as define in this application. In the example, the identification features of the Card itself will include: mechanical, barcode. In addition, the Card is configured with embedded controller to provide customer with convenient interfaces: LCD display; LED status, direction; built-in speaker; control buttons. In the shown example—the Shopping Card (303) is configured for continuous real-time monitoring and control by Controller (501) via store wireless LAN (507). The monitoring function could include: location; status; user interface; transactions executed; which could be used for recording actual behavioral patterns of a Customer, including: Modules visited; items purchased; time spent at a Module. Control features of the Card (303) could include: AUTO-navigation; display of selected shopping list and the next item to be purchased.

306—Shopping path for a Customer with the Shopping Card (303), directed by the store AUTO-navigation feature provided by Controller (501) via wireless LAN (507) and displayed on the Card (303). The real-time AUTO-navigation is based on most optimum utilization of availability of items and modules containing the items included in the shopping list selected by the Customer, with criteria of completing shopping within the shortest time possible. The shopping path, as part of AUTO-navigation, and the order of purchasing items included on the shopping list, will be adjusted by Controller (501) in real-time, as needed, depending on status of: items, modules, with an objective to reach the criteria—the shortest time to complete Shopping List.

307—Indicates use of Card (303) by the Customer to gain access to product modules in order to retrieve required item(s). As shown, the Card will be inserted by Customer into Product Module (400) to gain access and retrieve first items contained in product Module (400). In the example: only 3 product Modules are shown (for simplicity), and each product Modules (400-402) will be equipped with a barcode scanner on Customer and Provider sides, and a scale to measure combined weight of items inside the Module. Controller (501) via store LAN (506) will monitor Module status, including: item inventory; environment; barcode scanners; scale; and control access and support of Module to ensure its availability and quality of items stored inside. Once Card (303) is inserted and validated, Customer will gain access to items inside, and can proceed with completing transactions of selected items intended for purchase. Each transaction will require Customer to scan a barcode label on the item removed from the module (400). Based on barcode information and appropriate weight reduction of items remaining in the Module obtained by Controller (501) from Module (400) via LAN (506), the current transaction history for a Card (303) will be updated by Controller (501) in the Host Controller and Data Base (510). If any abnormality detected by Controller (501), including: improper weight change; wrong barcode label; item out of specifications (environment, shelf-life)—Controller (501) in real-time without store operator assistance will inform and direct the Customer on required steps to correct the problem, if possible, or inform operator and instruct Customer to wait for assistance from store operator. Problems which could be resolved by Customer directly without operator assistance, include: item had a wrong barcode label, or item is out of specifications (environment, shelf-life)—requiring Customer to return item back to Module and placing it in the designated "reject bin". Controller (501) will confirm correction steps executed by the Customer by monitoring the combined weight of the "reject bin" inside each Module, including (400). An expected weight reduction when item is removed from Module (400) would be equal to the weight of the item, while expected weight increase when item is returned to the "Reject Bin" of module (400) would be equal to the weight of the item. The barcode label of the item will include important specification parameters of the item, including: weight min/max; due date (shelf-life limit); temperature min/max.

400—Product Module, representing Modules (400-402). Each Module could be configured to support following functions: provide interface for customers; provide interface for identification Card; display module diagnostics, such as module identification, status, list of items available inside; provide storage for items available for purchase; maintain items available for purchase within items specification requirements; retain "rejected" items; provide module controller interface to store LAN. Product module could be configured to have sections such as: Customer section; Provider section; Reject section; internal controller section; environment control section. Provider section could be configured to be independent from Customer section, and allow a Customer to access the Customer section in order to remove required items, while Provider at the same time could access and deposit items into the Provider section. Simultaneous access to these sections improves store operating efficiency. Provider section could be configured to have its scale and barcode reader, and Customer section configured to have its scale and barcode reader, so that transition of items in-out of each section could be recorded as a transaction (deposit or withdrawal) of item in and out of Modules (400-402). Controller (501) and (509) will monitor operation of Module, and if out of specification condition is detected, such as temperature above the limit, Controllers will execute in real-time independent of operator a corrective function, which if not successful, will force Controllers to temporarily disable the Module from use, and inform store operator of required services. Module could be configured to require a barcode scan of labels on all transaction of items, including: loading into the module; removal from the module; relocation of items into a reject bin. In addition, module could be configured to monitor combined weight of items present in each section. Module could be configured to have two independent user interfaces, customer interface on one side facing area (300), and store provider on the side facing area (510), which is not reachable by the customer. Module could be configured to display on the user interface information of stored items inside, including: description, quantity, price, bin location of items inside module. Module could be configured to display on the provider interface information, including: inventory of items in all sections within the module; item specifications, including expiration date; item prices, including the ones being adjusted due to item specifications; module operating environment; maintenance schedule of devices within module; completed transactions. Module could be configured to include a camera to allow module controller, or controller (501) to record all transactions.

500—Section of a store where proposed Apparatus in this application is configured as a real-time closed loop control system for improving efficiency of store operations and efficiency of customer shopping. In the example—control system consists of: Controllers (500) and (509); Product modules (400-402); Card Control section (302); Inventory management section (502); Payment section (304); Shopping Cards represented by (303); LAN wired and wireless to interface respective components with Controllers. Module could be configured to accept coupons from a customer and adjust the price of a transaction accordingly.

501—Controller, as shown on FIG. 28, is configured to provide required interface for real-time monitoring and controls of devices installed within a designated section of a store (500), as shown via wired LAN (506) and wireless LAN (507). Controller (501) could be configured to be responsible for: maintaining required inventory of items within section (500); maintain items within specifications and direct activities to re-locate items which failed specifications; support activities of the host controller (509), including reporting: status of each device, item transactions, identification Card information; auto-navigation of a customer to execute a customer selected shopping list within set criteria.

502—Store inventory management system, controlled by Controller (501) and store Host Controller and central data base (509). At all times, inventory of items within the store is monitored by Controllers (501) and (509) in real-time. Inventory of items includes: items available at storage locations of (502); items inside Product Modules (400-402); items in possession of Customers inside the store per recorded transactions. In addition, condition of items or item specifications are monitored in real time by Controllers (501) and (509). As needed, Controllers (501) or (509). will execute controls requesting in real-time for store operator to deposit specific items from storage of (502) to Product Modules (400-402), as indicated by (505). As needed, Controllers (501) or (509). will execute controls requesting in real-time for store operator to remove specific items from "Reject Bin" of Product Modules (400-402) and return to designated "Reject Bin" of (502), as indicated by (505). Rejected items are processed per respective store procedures.

506—Store LAN allowing Controllers (501) and (509) to monitor and control operation of Product Modules (400-402). The monitoring will include: status of Module (in-use/available/in-service/not available); section environment (temperature, humidity); Identification features of a Shopping Card inserted; transactions executed under inserted Shopping Card; combined weight of items available for purchase; combined weight of items inside the "Reject Bin".

304—Payment station. Upon completion of all transactions Customer will be required to insert the Shopping Card (303) into designated slot of (304). Based on identification features of (303), Controllers (501) and (509) will download all transaction records executed by the Customer using Shopping Card (303). In the example, the Payment station is used for verification if all transactions recorded under the Shopping Card inserted into the station—were paid for by a Customer selected account listed in the Date Base of Controller (509). When the Shopping Card is not linked to a Customer account, then upon completion of all transactions, Customer will be required to pay for completed transactions using conventional methods: cash, credit Card, check. In either case, upon completion, Customer will receive receipt of all transactions, and the Card (303) will be de-activated by Controller (501) and returned back for circulation. At the Payment station (304)—Customer could review completed transactions, and execute respective options in terms of returning unwanted items, and getting respective credit for returned items.

305—Indicates the end of shopping by a Customer using the Shopping Card (303). As shown, items purchased by the Customer using Shopping Card (303)—remained in the shopping cart at all times, which saved considerable amount of time for both the store and the Customer, compared to existing shopping methods, requiring each item to be removed from the cart in order to scan the item barcode label, and then returned back into the cart.

509—Host controller, configured to monitor and control designated activities within store section (500), including: recording and analyzing item transactions; monitoring and analyzing available resources, such as: power consumption, man-power, utilization of space. Host controller could be configured to monitor in real-time directly or via section controller (501) connected to the Host controller via LAN (510) the inventory of items within the section (500) and the entire store, and based on specification parameters of an item, adjust its price per set algorithm stored in the host controller non-volatile memory. The algorithm of adjusting price of an item could be configured based on how much time left before the item shelf life will expires, and gradually reduce the price of the item, informing the store management of all adjustments, and when the shelf-life of an item had expired—prohibit the item from being purchased, and directing operator or customer to place the "expired" item into the reject bin. The price adjustment of items per algorithm could be estimated while the items are still inside a module, and will be registered during a transaction, informing the customer of price adjustment at the time the item barcode label is scanned. The host controller (509) could be configured to operate under an algorithm, which will guarantee that all items made available to customer are 100% within quality requirements and item specifications. Host controller could be configured to regulate identification features of a Card being issued to a customer by (302), and regulation could be based on previous transactions recorded under specific customer identification, and regulations could include: increasing or reduction in security attributes of the Card; refusing to issue and activate a shopping Card.

510—Area of a store allocated to be used by operators or store providers. This are is considered for service and maintenance, and is not allowed to be used by customer The Card could be used as a Shopping Card under control of the management of a store, or a section of a store. The Card is activated and useful only within designated locations, supported by respective Controllers and machines. Within specified locations, customers could purchase items using the Card only. Only one active Card with unique combination of properties (mechanical, electronic, barcode) is allowed by Controller or system within a shopping or designated location. The Card could also be linked to a customer account, and then used as a Shopping and Payment Card. When customer selects to use the Card as a Shopping Card, the example of a shopping process using Apparatus is described below and consists of the following steps:

1) STORE ENTRY—obtain Shopping Card. Customer upon entry into a store pick-up a Shopping Card and inserts it into Card Activation Module, where it will be locked until either:
   a) The activation process described below is complete, or
   b) Activation process is cancelled by Customer or Controller
2) CONFIGURE Shopping Card. Card Activation Module allows Customer to complete the Card activation process, which will include:
   a) Sign-in or create a new account, to be stored by Controller in the Data Base. Account will include Customer identification information, such as: name, contact, and other optional information provided by customer, such as: shopping list, payment account information.
   b) Enter new shopping list and store in the account, or select and edit as needed a shopping list from previously stored
   c) Activate the Card
   d) Remove the activated Card
   e) Receive from Card Activation Module a record (electronic, or print-out receipt) of completed steps of the Card activation process
   f) Select auto navigation criteria, such as: time, or distance, and enable the auto navigation feature, allowing Controller to direct the shopping sequence to complete selected Shopping List within set criteria
   Notes:
   1) At any time Customer can cancel the activation process, and remove non-activated Card and return to store.
   2) At any time Controller can cancel the activation process, and allow Customer to remove non-activated Card and return to store, or keep the Card locked-in, and inform store operator to remove the Card.
   3) Respective record (electronic, or print-out receipt) of failed steps of the Card activation process is available to Customer.
   4) In respect to the Shopping List—Customer can execute additional transactions or not execute transactions listed. Only completed and retained transactions and transactions completed and then returned—would be recorded, and information recorded will allow Controller to: prepare an invoice for Customer to pay for completed transactions before leaving the store; analyze Customer shopping habits, which could be useful to the store and Customer in improving the quality of the shopping process.
3) EXECUTE TRANSACTIONS. Customers, following Controller navigation instructions displayed on the Shopping Card, and/or following store signs, will approach available Module with items intended to be purchased by the Customer. Product Module or Vending Module will have diagnostics (visual, sound) to inform Customer of: Module status, items available, price, etc. When Module is available for purchases or transactions, respective diagnostics will inform the Customer. Customer will need to use the activated Shopping Card to access items inside Modules. Customer will need to insert the Shopping Card into designated slot of the Card Recognition device of the Module. Controller through Card Recognition device will analyze and verify identification features of the Card, and if acceptable, lock the Card inside the Card Recognition device of the Module, and mechanically retain the Card inside the Card Recognition device while transaction of items is active. Once the Card is authorized, the access door to the Module could be opened by Controller directly, or the access door could be opened by the authorized Customer. Removed items by customer with an intention to purchase will be registered by Controller as a transaction based on either: change of weight of items remaining inside the Module; barcode scan of the label on removed item performed by customer or automatically; combination of barcode scan and change of weight for added security. If no transaction is recorded within a pre-defined time window, Controller will remind Customer (status LED, message electronic or sound) to continue with transaction to avoid a time-out. If still no transaction—Controller will execute "inactivity time-out procedure", as defined by store. Upon completion of transactions at a Module, Customer will need to inform Controller of completion using available user interface on the Module (keyboard; touch screen; switch; wireless device, such as mobile which is configured by Customer and the store to be used for transaction interface). The barcode scan is recommended for items with stringent requirements in respect to their specifications, including: limited product shelf-life; stored environment (temperature, humidity). During the entire process, Controller is continuously monitoring specification requirements for items inside each Module, and informs operators of the store if corrective actions are required. In addition, Controller could disable a Module, which does not meet specification requirements for the items stored inside the Module. During a real-time transaction, Controller will again verify item specifications, and corrective actions will be executed to ensure the item not within specifications is removed from Transactions, and replaced with the item within product specifications, including shelf-life limit.

4) COMPLETE TRANSACTIONS. Upon completion of all transactions Customer will inform Controller through user interface at the Module, which will enable Controller to close the access door, or instruct the Customer to close door. As needed, Module could be configured to have a camera to monitor status, including: transactions; security; clearance before closing the access door. After the access door is closed and locked, Controller will release the Card from the slot of the Card Recognition device. Customer will remove the Card, and proceed with transactions at other Modules, or proceed to a Payment Module. At the Payment Module Customer will be required to insert the Shopping Card into Payment Module. The Payment Module will have diagnostics (visual, sound) to inform Customer of required steps to pay for completed Transactions. Payment Module during payment authorization steps will lock the Card, and present to Customer invoice consisting of all transactions executed (completed, credited, cancelled). Customer will need to select the method of payment, and upon completion of payment will receive a receipt (hard-copy, electronic), and will need to remove de-activated by Controller Card and proceed to the exit of the store where the Card will need to be returned and the cart with items purchased by the Customer could be inspected by store operator.

The above shopping process could be further simplified, if at step 2—Customer will link the Card to an account assigned to the Customer to a direct payment process (electronic account, cash balance account). In this case—step 4 will be simplified and consist of the following:

4) COMPLETE TRANSACTIONS. Upon completion of all transactions Customer will be required to insert the Shopping Card into Payment Module. The Payment Module will provide Customer with a receipt (hard-copy, electronic). Customer will need to remove de-activated by Controller Card and proceed to the exit of the store where the Card will need to be returned and the cart with items purchased by the Customer could be inspected by store operator The entire shopping processes described above allow Customer to move or transfer a purchased item only once, from location at the Module to Customer shopping cart. In contrast, the existing shopping processes require Customer to get an item, place the item into a cart, remove from the cart to present at the payment station, and then return back into the cart to remove out of the store. Using Apparatus described in this application, Customers will be able to save considerable mount of time purchasing required items. In addition, stores will be able to provide exceptional services within significantly lower expenses. A store with significant number of Modules with variety of items available for purchase, could be supervised and operated by only few store operators, and not only provide savings to consumers and providers, but also ensure highest quality of products and services at all times.

Table 4 below compares shopping steps and their estimated time for existing systems and proposed system based on Apparatus. If there is no difference—"no change" label is used. Time is illustrated in minutes. Barcode labels are required to complete transactions for existing method, but also included as a component of the Apparatus, as described in the application. Barcode labels of items are processed by the Apparatus to insure: items are maintained within their specification requirements; and items availability is maintained per demand. Barcode labels are also used to track inventory of Modules, and sections of Modules, including portable. The Apparatus is configured to maximize quality of service. In the Table 4, parameters are estimated based on shopping example of purchasing 10 different items, with 50% of items requiring packing for the existing method, and paying at an unattended station with 5 other customers ahead in-line with same number of items equal to 10, with Customer required to scan each item for the existing method.

TABLE 4

| Shopping Steps | Existing Method | Estimated time (minutes) | Using Apparatus | Estimated time (minutes) |
| --- | --- | --- | --- | --- |
| Visit store | No change | | No change | |
| Activate Card | N/A | | Required | 1 |
| Find product | No change | 20 | Significantly improved with auto-navigation | 10 |
| Insert-validate Card | N/A | | Required | 2 |
| Get item/product | Same | | Same | |
| Scan item barcode label | N/A | | Required | 2 |
| Pack item (plastic bag) | Required | 1.5 | N/A | |
| Place item into cart | Same | | Same | |
| Close transaction | N/A | | Required | 2 |
| Approach Payment station | No change | | No change | |
| Wait in-line at Payment station for other Customers to remove-scan-load items | Required | 5 | N/A | |
| Wait in-line for other Customers to pay | Same | | Same (NOTE 1) | |
| Remove items from cart | Required | 0.2 | N/A | |
| Scan items barcode | Required | 0.2 | N/A | |
| Pay for transactions | Same | | Same | |

TABLE 4-continued

| Shopping Steps | Existing Method | Estimated time (minutes) | Using Apparatus | Estimated time (minutes) |
|---|---|---|---|---|
| Place items back into cart | Required | 0.2 | N/A | |
| Inspection at the exit | N/A | | Optional | .5 |
| Steps to signify differences are calculated | TOTAL: | 27.1 | TOTAL: | 17.5 |
| Product quality | No guarantee | | 100% guaranteed | |

NOTE 1: The activity related to "Wait in-line for other Customers to pay" could be further reduced, when customer prior to begin shopping, links an activated Shopping Card to a customer payment account stored in the data base, which will allow each item transaction to be billed directly at the point of transaction, such as at the Module where transactions are taking place, which will also print out a receipt for all transactions completed at the Module.

As shown in Table 4, using Apparatus, the time savings on average are equal to 9.6 minutes for each Customer. In addition to savings in time, the proposed Apparatus will ensure all items will retain 100% factory sealed quality, which is cost-unattainable using existing methods. The proposed method by this application, compared to any existing methods, is significantly more efficient in time and costs. In addition, in mathematical terms, under real-time customer navigation by controller—the proposed method ensures that the customer time required to purchase items is no longer dependent on the time required by other customers ahead in-line to complete time-consuming steps, consisting of: removing items from the shopping cart, scanning items, bagging and placing purchased items back into the shopping cart. This is a significant time saving for a customer during real transactions. Ability to purchase items, such as the ones sensitive to environmental conditions (ice cream, refrigerated food, etc.) within the shortest time possible could be essential to retain item quality. Stores of different sizes will benefit. Large retail and grocery stores like Wal-mart, can use the Apparatus for automating the grocery section of the store, allowing customers to purchase prepackaged environmentally sensitive items within the shortest time. Other items, such as clothes, could be purchased by customers prior to visiting the automated section of the store.

The invention claimed is:

1. An Apparatus comprising: at least one module, at least one card, at least one controller, at least one card recognition device, at least one non-volatile memory device for storing and retrieving data, at least one item with a barcode label, at least one barcode sensor, at least one environmental sensor, at least one actuator wherein the module is configured to contain items, and devices, including: user interface; actuators; sensors, including scales;

wherein the module is configured to include at least one door, restricting access to items inside;

wherein the module is configured to include a controller connected to devices inside the module, and connected to other controllers, including remote;

wherein the module is configured to maintain items within specifications, including environment;

wherein the module is configured to include a card recognition device, which is connected to local or remote controller;

wherein the module is configured to include a barcode reading device, which is connected to local or remote controller;

wherein the module is configured to include user interface, which is connected to local or remote controller, and is used by controller to monitor, record and complete item transactions;

wherein the module is configured to allow controller to operate the access door;

wherein the module is configured to allow authorized simultaneous access to different sections of the module, including: item transactions related to user purchases, item transactions related to provider maintaining inventory and quality of items;

wherein the module is configured to have at least one environmental sensor connected to controller;

wherein the module is configured to have a barcode label with information, including: code, location, capacity;

wherein the card is configured to have at least one of the identification features, which include: mechanical identification, electronic identification, barcode identification;

wherein the card mechanical identification features are configured to include at least one of the following: openings, characterized by their size, shape, location; physical properties of the materials the card or section of the card is manufactured from; card dimensions, shape, color of the entire card or color-coded sections of the card; slots or grooves, which are used for alignment; symbols or markings, which are recognized by optical reading devices and used for alignment; openings which are used for mechanically latching or locking the card in-place by inserting a holding pin through the opening;

wherein the card electronic identification features are configured to include at least one of the following: active electronic circuits, including RFID; passive electronic circuits, including network of resistors connected in-parallel; embedded controller; user interface, including: control keys, display, diagnostics;

wherein the card barcode identification features include industry standard barcode label or labels, which is configured to include: card code; card location;

wherein the card identification features is attached to one or both surfaces of the card, or embedded inside the card;

wherein the card with selected identification features is made out of environmentally friendly materials, and is recyclable for multiple use, as needed;

wherein the card with selected identification features is used as a shopping card, allowing access to items or products inside modules, and then used by controller to record item transactions, including information related to payments required to purchase selected items;

wherein the card with selected identification features is used by an user;

wherein the card is configured to allow the user via controller to link selected identification features of the card with the user account information, including payment information, and then used as a payment card, allowing user to access items modules, and then used by controller to record item transactions, including executing payments for selected items during transaction;

wherein the card configured with embedded controller will enable an user to interface with store controller, and select or create a shopping list, and then display navigation instructions to direct the user within a store to complete the shopping list within set criteria;

wherein card recognition device is configured to interface with controller;

wherein card recognition device is configured to allow the identification card to be inserted into the reading slot of the card recognition device;

wherein card recognition device is configured to have sensors, which are used by controller for verification of alignment of the card inserted into the reading slot of the card recognition device;

wherein card recognition device is configured to have channel or channels, which are mechanically mated with respective grooves of the card, and are used for proper direction and orientation of the card during insertion of the card into the reading slot of the card recognition device;

wherein card recognition device is configured to have an actuator, which is when activated by controller, will extend its plunger through a designated opening of the card inserted into the slot, and mechanically prevent the card from being removed; and further configured to release the card when the actuator is deactivated by controller;

wherein card recognition device is configured to have sensors, which are used by controller for verification of identification features of the card inserted into the reading slot of the card recognition device;

wherein card recognition device is configured to be installed into a module or next to the module;

wherein at least one controller is configured to be connected and have access to at least one non-volatile memory for storing and retrieving data;

wherein controller is interfaced with other devices of the apparatus via wired and/or wireless LAN, including telemetry and internet technologies;

wherein controller interfaced with other devices of the apparatus, and based on real-time item transactions and data entries, will monitor in real-time inventory of items, including: inventory within a module, section of a store;

wherein controller interfaced with other devices of the apparatus, will coordinate store activities in providing supplies of items within a store, including: availability of items inside modules to meet requirements of active or current shopping lists selected by users inside the store;

wherein controller interfaced with other devices of the apparatus, will generate reports in real-time, including: list of required items to be delivered to a module, or section of a store; items requiring removal from a module due to item being out of specifications;

wherein controller connected to devices of the apparatus will in-real time activate or de-activate the identification card inserted into a module;

wherein controller will in real-time activate or de-activate access to a module based on card information obtained from the recognition device of the module the card is inserted in;

wherein controller will in real-time using mechanical locking feature of the card will lock the card inserted into a card reading module and keep the card mechanically locked while executing controls including: card identification, item transactions;

wherein controller will monitor, analyze and record activities related to a card, and based on provided criteria, the controller will in real-time activate or de-activate specific identification features of the card, regulating its access to modules, or section within a designated location;

wherein controller based on information provided by an user, and based on user transaction records stored in data base, will verify the user eligibility, and upon approval, the controller will configure the card accordingly;

wherein controller based on an user information linked to selected identification features of the card will analyze transaction records stored in data base and generate shopping list containing most frequently used items, and store the information in the non-volatile memory data base;

wherein controller based on an user information linked to selected identification features of the card will allow the user to record and store shopping lists in the non-volatile memory data base;

wherein controller based on an user information linked to selected identification features of the card will allow user to select specific shopping list stored in the non-volatile data base and set the list as current;

wherein controller based on an user information linked to selected identification features of the card, and based on availability of items on current shopping list at a location including a store, will in real-time without operator assistance control and display information on the card in possession by the user, and direct the user within the store to complete transactions of the current shopping list within set criteria, including fastest time;

wherein the item with a barcode label, with barcode label attached to the item, and label configured to be readable by barcode reading devices of the apparatus;

wherein the item with a barcode label, with barcode label configured to include information, including: item code; item price; item environment specifications; item expiration date;

wherein the item with a barcode label placed into a module, or removed from a module, and its physical transition or transaction will be monitored by controller when its barcode label is scanned or read by barcode reading device of the apparatus;

wherein the item with a barcode label traced by controller within apparatus by monitoring item transactions at various locations, including modules, where transactions took place;

wherein controller will monitor status of barcode reading devices, and based on information obtained from barcode reading devices the controller could monitor the item transitions or transactions, including the transactions related to a module;

wherein controller will monitor status of barcode reading devices, and based on information obtained from barcode reading devices the controller will calculate the inventory of items within the apparatus, including inventory of items within modules;

wherein controller based on inventory of items directly or indirectly execute controls to provide additional item or items with specific barcode label to a module or modules;

wherein controller will record information related to transition or transaction of items into the non-volatile data base, and the controller will obtain recorded information from the data base;

wherein controller will monitor environmental sensor within a module and, depending on information obtained from the sensor, controller will in real-time directly or indirectly activate controls to maintain environment within the module to within required range and specifications;

wherein controller will allow access to a module for as long as the identification card is inserted into the card recognition device of the module, and is accepted or authorized by controller;

wherein controller, based on item identification including barcode, will in-real time record transition and transaction of item or items related to a module specific to the identification card used to gain access to the module, and store the information in the data base;

wherein controller, based on item identification including barcode, will record transition or transaction of item or items related to a module or modules where the identification card was used to gain access to the module, and store the information in the data base;

wherein controller, based on item identification including barcode, will obtain from the data base costs information about the item or items, and calculate costs for each transition or transaction of the item or items, and store the information in the data base;

wherein controller, based on card identification features, will obtain from data base all transactions records related to a card inserted into a slot of card recognition device, including modules, and present the user of the card with an opportunity to purchase items listed on the transaction report;

wherein controller is configured to adjust in real time price of item, based on apparatus status, including: inventory of items; specification of items; date; user provided coupons;

wherein the apparatus, consisting of: modules, controllers, sensors, non-volatile memory, identification card, card recognition devices is configured as a real-time closed loop control system, and the control system directly, without operator assistance, based on information obtained from the card and based on set criteria, will authorize access to items inside the module or access to a location where items are present, and will monitor, analyze and record transactions of items executed under unique identification features of the card being used;

wherein the apparatus is configured without operator assistance, to monitor, analyze and record transactions executed under unique identification features of a card being used, and provide the records to modules to complete the transactions, including generating an invoice of items being purchased and receipt of a payment;

wherein the apparatus is configured as a real-time closed loop control system to monitor, analyze and record information about devices within apparatus, including: number, layout and location of devices, and provide real-time navigation instructions to users and providers to minimize time required to complete item transactions included in the activated shopping lists.

2. The apparatus of claim 1, wherein module is configured to accept an identification card, and allow an user to configure the inserted identification card, and configuration includes: shopping list of items, mode of navigation manual by user or automatic by remote controller, user interface controls.

3. The apparatus of claim 1, wherein module containing items is configured as an automatic vending module, further configured to accept and verify identification features of a card inserted, and dispense items to authorized users, and based on sensors installed in the module, verify and record item transactions based on barcode information of items dispensed.

4. The apparatus of claim 1, wherein module containing item is configured as an automated item storage module, further configured to accept and verify identification features of a card inserted, and allow access to items inside to authorized users, and using sensors installed in the module, verify and record item transactions based on barcode information of items removed or inserted, and based on change of weight detected.

5. The apparatus of claim 1, wherein module is configured to mechanically engage with the card inserted preventing the card from being removed while transactions are in-progress, and then releasing the card after transactions are completed and access door to items inside the module is closed.

6. The apparatus of claim 1, wherein controller based on set objectives by an user, including shopping list; time to complete the shopping list; and based on store status, including: inventory of items included on the shopping list; availability of modules containing items included on the shopping list; time remaining to complete the shopping list—will in real-time without operator assistance execute controls, including: auto-navigation of the user activities within the store in procuring the items on the shopping list, maintaining required inventory and quality of items inside the store, with a goal to achieve set objectives.

7. The apparatus of claim 1, wherein controller connected to sensors, actuators, other controllers will monitor item related parameters, including: inventory, environmental specifications, and in real-time with or without operator assistance will execute controls to sustain required inventory of items within item specification requirements, and inform operator of rejected items, which need to be removed from the inventory.

8. The apparatus of claim 1, wherein controller based on an user on-line order, including order on internet, consisting of: store location; user shopping list including items typically available in a store; and also special items requiring pre-ordering, will execute controls to estimate time required to make available ordered items at specified store location, and provide the user with initial estimate of time when the items will be available, and then confirm to the user their availability via contact by phone or internet, and reserve these items within designated modules within specified time window.

9. The apparatus of claim 1, wherein card is configured with embedded controller, which will interface with a remote controller over wireless LAN.

10. The card of claim 9, wherein embedded controller within a card will provide user interface, including: control buttons, display, diagnostics, audio, and communicate via wireless LAN the user activated controls to remote controller.

11. The card of claim 9, wherein embedded controller within a card will via wireless LAN obtain in real-time controls and information from a remote controller, including: store status; shopping list information; information of items included in the shopping list; location and status of modules where items from the shopping list could be purchased; navigation instructions, including: direction control; estimated time to complete selected shopping list, and present information to a card user via available visual and audio interfaces embedded into the card.

12. The apparatus of claim 1, wherein module is configured to contain sections, including: sections allocated to one item or different items; sections allocated for reject item; sections allocated for special items; sections with designated access gate; with controller regulating access to each section, and monitoring status and inventory of items within each section.

13. The module of claim 12, wherein the module or a section of the module configured as a portable module or a portable section, and each are configured to have a barcode identification label further configured to include information about the module or section of the module, used by controller to monitor location of the module or section of the module.

14. The module of claim 12, wherein portable module removed from its location within a store, and transported to another location within or outside the store, including remote location, for being loaded with items, and then return back for installation in the original store or another store.

15. The module of claim 12, wherein portable section of a module removed from the module, and transported to another location within a store or a remote location, for being loaded with items, and then returned back for installation into original module or another mating module within or outside the store.

16. The module of claim 12, wherein each section of the module configured to contain sensors, including: barcode reader; weight scale; environment; security, which are monitored by controller.

17. The module of claim 12, wherein each section of the module is maintained by controller within section specifications, including: environment; security and expiration date, and controller configured to prevent utilization of sections which are out of specifications.

18. The module of claim 12, wherein each section of the module is monitored by controller to report inventory of items in each section, and report transaction of items related to each section.

19. The module of claim 12, wherein each section of the module is monitored by controller to report when an item in process of a transaction is out of specifications, including preventing completion of transaction of items being out of specifications.

20. The apparatus of claim 1, wherein controller inside a module, or a remote controller is configured to provide an user with options to link completed transactions to user payment account, and allow the user to make required payment for executed transactions, including the module where transactions took place, and then receive a payment confirmation including printed receipt, and leave store with purchased items upon return of the shopping card, de-activated by controller, and which was used by the user to complete transactions.

21. The Apparatus of claim 1, wherein controller will in real-time monitor inventory of: devices within apparatus, including portable modules and sections; items within devices, including items within modules and sections of modules: and based on status of the inventory and demand for items, will provide reports of actions required to sustain required inventories in support of real-time demand of items.

* * * * *